United States Patent [19]
Husseiny

[11] Patent Number: 5,210,704
[45] Date of Patent: May 11, 1993

[54] SYSTEM FOR PROGNOSIS AND DIAGNOSTICS OF FAILURE AND WEAROUT MONITORING AND FOR PREDICTION OF LIFE EXPECTANCY OF HELICOPTER GEARBOXES AND OTHER ROTATING EQUIPMENT

[75] Inventor: Abdo A. Husseiny, LaPlace, La.

[73] Assignee: Technology International Incorporated, LaPlace, La.

[21] Appl. No.: 592,057

[22] Filed: Oct. 2, 1990

[51] Int. Cl.$^5$ .............................................. G01H 17/00
[52] U.S. Cl. ............................... 364/551.01; 364/506; 395/912
[58] Field of Search .................... 364/550, 551.01, 506, 364/507, 508; 395/911-913; 73/116, 117.3

[56] References Cited

U.S. PATENT DOCUMENTS

| | | | |
|---|---|---|---|
| Re. 31,750 | 11/1984 | Morrow | 364/508 |
| 3,390,248 | 6/1968 | Illingworth . | |
| 3,544,774 | 10/1965 | Peklenik | 235/151.13 |
| 3,697,957 | 10/1972 | Barron | 364/148 |
| 3,962,694 | 6/1976 | Calia et al. | 340/267 R |
| 4,023,044 | 5/1977 | Miller et al. | 307/116 |
| 4,084,245 | 4/1978 | Bunge | 364/485 |
| 4,115,867 | 9/1978 | Vladimirov et al. . | |
| 4,433,385 | 2/1984 | De Gasperi et al. | 364/554 |
| 4,472,784 | 9/1984 | Blachman | 364/554 |
| 4,587,470 | 5/1986 | Yamawaki | 318/564 |
| 4,866,635 | 10/1989 | Kahn et al. | 395/911 X |
| 4,967,337 | 10/1990 | English et al. | 395/912 X |
| 5,018,069 | 5/1991 | Pettigrew | 364/551.01 X |
| 5,020,007 | 5/1991 | Wu et al. | 364/551.01 |
| 5,025,392 | 6/1991 | Singh | 395/911 X |
| 5,027,268 | 6/1991 | Sakurai et al. | 364/551.01 X |
| 5,050,108 | 9/1991 | Clark et al. | 364/551.01 |

OTHER PUBLICATIONS

Application of Constraint Suspension Techniques to Diagnosis In Helecopter Caution/Warning Systems, Greg Glenn, American Helicopter Society, Apr. 1988.
Reasoning About Device Behavior Using Qualitative Physics, T. P. Hamilton and C. Jacobson, American Helicopter Society National Specialists Meeting, Apr. 1988.
Helix: A Helicopter Diagnostic System Based on Qualitative Physics, Thomas P. Hamilton, American Helicopter Society National Specialists Meeting, Apr. 4-6, 1988.

Primary Examiner—Parshotam S. Lall
Assistant Examiner—E. J. Pipala
Attorney, Agent, or Firm—Sixbey, Friedman, Leedom & Ferguson

[57] ABSTRACT

A wearout monitor for failure prognostics is a prognosis tool to predict incipient failure in rotating mechanical equipment. The wearout monitor provides maintenance management of a plant or process with information essential to planning preventive maintenance strategies. The monitor also assists in constructing a data base for development and implementation of policies for plant life extension, refurbishment, and modernization. The apparatus identifies systems of operation degradation of the whole system, as well as diagnosis of signs of commencing aging cycles of specific equipment, components or parts of equipment during operation. Data from the system is stored and also supplied to a central processing unit which includes an expert system, rule-based failure data bank, a predictor, a performance evaluator and a system identifier. The results of the predictions are supplied to management terminals or other indicators for subsequent use. Combination of prognostics and diagnostics of the symptoms of existing fault in mechanical equipment allows continuous on-line monitoring of systems to predict failures at early stages before leading to catastrophic breakdown and to assure safe and economic operation. By providing correlations between defect sizes and life expectancy of a rotating mechanical component, the monitor can provide the operator of the equipment with a warning time that indicates the time before loss of operation, thereby being critical to operation of transport systems wherein gearboxes can lead to loss of transmission power and subsequent loss of life particularly in helicopters.

71 Claims, 23 Drawing Sheets

SYSTEM FOR PROGNOSIS AND DIAGNOSTICS OF FAILURE AND WEAROUT MONITORING AND FOR PREDICTION OF LIFE EXPECTANCY OF HELICOPTER GEARBOXES AND OTHER ROTATING EQUIPMENT

FIELD OF THE INVENTION

The invention relates generally to a wearout monitor for failure prognostics to predict incipient failure in rotating mechanical equipment and more particularly relates to a method and apparatus for prognostics, diagnostics, and early warning to operators of mechanical systems of potential failure and the remaining life of the mechanical components which are critical to operation and safety (such as gearboxes of helicopters and coolant pumps in nuclear power stations or like components) wherein one or more measures suitable for incipient failure monitoring (e.g. rate of growth of a defect or sudden decline of torque) are identified by various prediction techniques including time series analysis, frequency spectrum analysis, diffusion and drift of defects as well as physical models, and operation and design specifics of the rotating mechanical device.

BACKGROUND OF THE INVENTION

Motivated by economic and technical incentives, operators and crewmen of rotating machinery are awaiting with anticipation for revolutionary developments in maintenance management that would replace conventional (pre-scheduled) maintenance schemes and scheduled overhauls by a program based on established specifications. In other words, a machine element will not be taken out of service until some means of functional prediction shows that the element is defective or will be inevitably faulty within a short time and that the defect will affect the operation in total.

Conventionally, new equipment is installed, maintained, and overhauled at regularly scheduled intervals. Trade-off between the cost of unscheduled machine breakdown and the cost of unnecessary maintenance is inevitable. The ability to detect and possibly diagnose faults in rolling elements and rotating machinery has been widely employed. However, diagnostics are not enough to a priori detect symptoms of equipment failure and to avoid any subsequent damage, without prognostic capabilities. Based on information extracted from early appearing symptoms of failure, prognostics of a system can provide predictive capabilities using both trend analysis and parametric analysis.

Accordingly, there is a need for prognostic capabilities to minimize unpredicted failures, reduce maintenance costs, and increase machine availability especially in combat by the use of continuous inprocess monitoring, detecting, and indicating failure modes prior to the failures of mechanical equipment.

Based on life tests of typical mechanical equipment, a high rate of failure is observed at the start of life due to the presence of defective components. Excluding such defective lot, the failure rate maintains a constant rate for a long period of time until wear takes place and the failure rate rises at a rapid rate once a defect appears. Localized defects ultimately brings the element's life to a sudden end, since a defect starts to grow in size and induces the presence of other defects.

Accordingly, there is a need for on-line monitoring system to detect failure symptoms from inception until defect growth takes place and to identify incipient failure. This requires a combination of diagnostics and prognostics capabilities.

A warning system based on prediction of incipient failure is important since some failure modes; such as fatigue, in critical components of machinery may lead to potential faults which cannot be monitored. Also, significant increase in availability and reliability, as well as improvement in maintainability of gearboxes (and rotating machinery in general) can be achieved by developing a capability to continuously predict the remaining acceptable operating life.

Accordingly, there is a need for a system that combines diagnostic and prognostic capabilities with a warning capability that alerts the operator or pilot during flight or during equipment operation, and the inspection, testing and maintenance crew during offline maintenance to the expected acceptable and safe operation time before the next overhaul or replacement of the equipment.

In the presence of a detected defect, especially in a helicopter main gearbox, associating the size of detectable defects and the warning time (expected duration of acceptable operating time) that remains before the gearbox can no longer transmit the required operating power is necessary to assure safe and efficient performance since in the helicopter gearbox, rolling contacts play a major role in the failure. Although helicopter gearbox defect detection systems are in existence, the effectiveness of such systems is dependent upon the warning that is given prior to the complete failure of the gearbox based on predicting degradation due to causes such as wear and fatigue of typical mechanical equipment with rolling contact, such as rolling element bearing and gear of the helicopter main gearbox. The rate of growth of specific sizes and types of defects under various loading conditions relate the loading conditions to specific application and then to the expected operating life.

Accordingly, there is a need for a measure of life expectancy with appropriate confidence limits and based on the growing rate of defects to be employed in such warning system.

A variety of systems are known which employ computers and sensors in conjunction with "expert" systems, and to predict systems performance. An example of such system is U.S. Pat. No. 3,390,248 issued to Keller which relates to an impact sensing detector and provides an apparatus that monitors the operation of metal forming impact presses, wherein monitoring is done by comparing the signal amplitude against corresponding standard samples derived from normal process operation. The difference between compared samples are indications of malfunction. No stochastic time series data analysis or defect growth rates were involved and the detector is applied to equipment different from those to be monitored by the present invention.

In another example, U.S. Pat. No. 3,544,774 issued to Peklenik, relates to an apparatus for determining of a statistic characteristic magnitude in stochastic processes specially that of a fluctuating signal parameter for testing a process or condition by multiplying together signals derived from a device which calculates the standard deviation of the fluctuating parameter, a function generator which produces a constant signal which is a known function of the predetermined value, and a counter which records the number of occasions on which the parameter exceeds a predetermined value.

U.S. Pat. No. 3,697,957 relates to a self-organizing control system, the control system combines statistical decision theory, prediction theory, and rapid trial generation to determine future control actions. The system includes on-line sampling and changing of the system operation. Performance assessment units are included, and a "probability state" variable units are included for the control operation.

U.S. Pat. No. 3,962,694 issued to Calia et al. relates to a method and apparatus for monitoring of the stress level output of electrically actuated tools to ensure that the tool is operated correctly on each successive run. Thus, the apparatus prevents recycling of the tool.

U.S. Pat. No. 4,023,044 issued to Miller et al. discloses an automatic machine tool including a monitoring system and describes a system wherein the values of a test function are monitored against the value of a reference function, where the test function uses a signal produced by a transducer in response to mechanical impulses developed by operation of the machine tool.

U.S. Pat. No. 4,084,245 issued to Bunge sets forth arrangement for statistical signal analysis and uses spectral component of signals and through a comparison device, compares if the instantaneous signal values of all spectral components corresponds to the stored corresponding signal values. The function of this system is purely signal analysis using spectral components.

U.S Pat. No. 4,115,867 to Valadimirov discloses a special purpose digital computer for computing statistical characteristics of random processes utilizing stochastic data rounding units. However, this reference fails to teach the use of this circuit for detecting or indicating the condition of a systems operation.

U.S. Pat. No. 4,433,385 issued to De Gasperi relates to a method and apparatus for real time detection of false and industrial objects and describes a system for quality control using image processing methods, where the image of a sample object is taken, digitized and stored. While this reference discloses a system for the detection of faults, it does not set forth a system which uses stochastic time series signal analysis, or the detection of defect growth rate.

U.S. Pat. No. 4,472,784 issued to Blackman relates to a technique to insure independence in random sampling for data gathering purposes. However, this reference is limited to providing an improved random sampling process and does not relate to the prognosis and diagnosis of potential failures.

U.S. Pat. No. 4,587,470 relates to a multiplex control system having a backup controller. In case of an abnormal condition, control is switched from the main controller to a secondary controller. An interfacing means is provided for providing a time lag to prevent tracing of control data. The control system addresse difficulties in tracing computational data for a system including main and subsidiary controllers of different hardware structures, such as analog and digital devices in combination. Thus, this reference addresses the problem of providing two differing control structures to assure reliability.

U.S. Pat. No. 31.750 to Morrow discloses a system for monitoring malfunction of machinery by analyzing data representing machinery operation and using trend monitoring to produce an electrical signal indicative of a physical condition of the apparatus to be monitored after the occurrence of a malfunction; however, this reference is not concerned with early symptoms of degradation which may occur slowly and suddenly end in catastrophic failure, thus allowing detection of wearout at an early stage before the system shows any kind of malfunctioning. Vibration signals are used in monitoring vibration produced by machinery and are analyzed using frequency spectrum analysis after a malfunction is detected; however, spectrum analysis is not used for detection of malfunction. A succession of stored signals from any monitor which would indicate a probable malfunction of the apparatus and probable time to failure is calculated by a computer and plotted as signal amplitude versus time. Morrow further fails to disclose the use of stochastic filter elements of models.

The above-cited references fail, however, to disclose a method of monitoring wear or defect growth in rotating mechanical components using stochastic analysis which thus allows detection of degradation or incipient failure long before the component fails and which provides a warning of the remaining time to failure, as more particularly described and claimed herein.

There is, therefore, a need in the art for a reliable wearout monitor for prognostics to predict incipient failure in rotating mechanical equipment and for diagnostics of recurring symptoms as failure progresses in the equipment and for diagnostic of recurring symptoms as failure progresses in the equipment.

There is also a need in the art for a knowledge-based model of the process and components of interest, formulating an empirical time series model from measured signals, and predicting dynamic behavior of the system and its components of interest by evaluation on noise and other behavior of the signals, and using a rule-based expert system to identify the nature and location of an impending failure.

SUMMARY OF THE INVENTION

The present invention relates to a wearout monitor (WONITOR TM) series, the first of which is wearout monitor-P for failure prognostics and identification of incipient failures; the second is a wearout monitor wearout monitor-PD involving an integrated on-line prognostics and diagnostics capabilities to identify incipient failures, detect symptoms of performance degradation of large systems as well as their components during operation, especially rotating mechanical equipment and rolling components such as turbines bearings, gears, and pump impellers; and wearout monitor-L for correlating between detectable defect sizes and the expected life of a rotating mechanical equipment to provide a warning for the remaining time until failure of the equipment.

Summarily, the wearout monitor-P monitor utilizes information available in normal operations data such as noise, temperature or other fluctuations to provide an indication of changes in critical equipment through time series analysis of measured data. Digital signals representing system operation are sampled and filtered through a stochastic filter to provide stationary data. The filtered data is them directed to a model synthesis module to identify stochastic models adequately representing the data for wearout measurement and to specify wear-related parameters and to give a visual or audio indication when they are exceeded.

The wearout monitor for incipient failure prognostics is a prognosis tool to predict incipient failure in rotating mechanical equipment. Failure, if not detected prior to its occurrence, may disable the equipment or induce damage in the whole system.

The wearout monitor-P provides the maintenance management of a plant/process with information essential to planning preventive maintenance strategies. A prognostic scheme assists in constructing a data base for development and implementation of policies for plant life extension, refurbishment and modernization. The apparatus has the capability of identifying symptoms of operation degradation of the whole system as well as diagnosis of signs of commencing aging cycles of specific equipment, components, or parts of equipment during operation.

Use of the wearout monitor-P requires well defined instrumentation in new process designs to assure the presence of strategies in new process designs to assure the presence of appropriate sensors and adequate signals for providing enough information to the prognostics module. Existing plants or processes may require installation of additional instrumentation and sensors to provide information on system performance and operation variables. This can be easily accomplished as part of retrofitting the plant/process with the wearout monitor-P hardware.

The wearout monitor-PD can be also incorporated in new designs as part of the instrumentation and control subsystem or retrofitted in existing processes. This aspect of the invention provides a method and apparatus to diagnose or prognose initial defects at a very early stage, by providing a direct index which reflects the real condition of the monitored system and using a matched filter based on pattern recognition to distinguish the features of the system signature. In systems such as robotic vehicles, helicopters, and tanks, prognostics/diagnostics provide means to recognize commencement of defects or deteriorating conditions, and implement certain corrective actions to prevent failure. System state monitoring data is used to determine maintenance manpower and spare parts requirement more accurately, and to establish an effective preventive maintenance management program.

The wearout monitor-PD utilizes monitoring techniques based only on interpretation of signals from sensors. Today's technology provides a capability of reasoning from human experience to perform data analysis. Therefore, incorporation of artificial intelligence features to perform the prognostics/diagnostics became possible. A highly intelligent mechanical system should be able to not only predict what, but also when, how and why a failure will occur by itself, and to judge what action should be taken before a serious failure takes place.

The wearout monitor-PD uses information embedded in signals from sensors appropriately located in the process to identify existing deterioration or abnormalities and predict future trends in performance including anticipated failures of components. The signals received by the wearout monitor-PD include global signals indicative of plant/process performance as well as localized signals that provide measures of parameters tightly associated with the performance of the equipment to be monitored. Once a trend of degradation, abnormalities or performance abnormalities are detected from the global signals, the analysis of the localized signals are used to identify the specific equipment or component that is expected to fail or induce failure.

The wearout monitor-PD performs autoregressive (AR) analysis in the time domain, as well as spectrum analysis in the frequency domain of global and localized signal data. The localization of incipient failure sources is done via comparison of the results of the analysis with previous results which are stored in the wearout monitor-PD. Also, the outcome of a prior fault tree analysis (FTA) and failure mode and effect analysis of the process is used to narrow down the search for the equipment which may lead to anticipated failures.

The wearout monitor-PD performs the steps of: constructing a knowledge-base for the process/plant and its components, continuously analyzing global and local signals using the AR technique, employing diagnostic logic to examine anomalies in operation or performance, using the knowledge-based to provide a rule-based monitoring expert system, predicting future trends based on analyzed data and employing a Kalman filter, displaying diagnostic messages and trend messages, displaying estimates of remaining life, and displaying appropriate maintenance actions.

A detectable defect, drift, diffusion model is used in this invention for prediction of life expectancy of rotating mechanical systems, specially helicopter gearboxes, given a known type and size of bearing or gear defect. The prediction is incorporated into a capability to provide a correlation between the size of detectable defects and the warning time (expected duration of acceptable operating time) that remains before the gearbox can no longer transmit the required operating power. Life expectancy of equipment varies with system conditions which are subject to temporal changes and which are affected by the quality and frequency of overhauling and replacement of components.

Local asperities and changes in lubricant viscosity are usually due to contact fatigue. Damage due to other mechanisms often results from obvious mechanical, chemical, or electrical factors. The criticality of an induced defect determines whether or not a terminal failure will occur. The effectiveness of a helicopter gearbox defect detection system is dependent upon the warning that is given prior to the complete failure of the gearbox. The model predicts degradation due to causes such as wear and fatigue of typical mechanical equipment with rolling contact, such as rolling element bearing and gear of the helicopter main gearbox.

It is, therefore, an object of the present invention to employ an expert system for analysis of data of a system to predict incipient failure of equipment.

It is another object of the present invention to employ a rule-based model of failure modes, a knowledge-based model of the process and components of concern, and formulating an empirical model using a time series analysis, in conjunction with an expert system to predict the nature and location of an impending failure.

It is a further object of the present invention to provide an on-line prognostic/diagnostic monitor capable of detecting, indicating and predicting equipment failure based on symptoms of potential failures and initial appearance of information indicative of future defects, and of determination of specific types of failure in mechanical equipment and related hardware.

It is still a further object of the present invention to provide a prediction model for helicopter gearbox life expectancy and incorporation of the model in a capability that can alert personnel of the expected duration of acceptable operating time based on the size of detectable defects as sensed by the rotating mechanical device especially helicopter gearbox defect detection system.

These and other objects of the present invention will be understood by those acquainted with the design and construction of such systems upon reading the following detailed description in conjunction with the accompanying drawings.

DETAILED DESCRIPTION OF THE INVENTION

Figure 1:
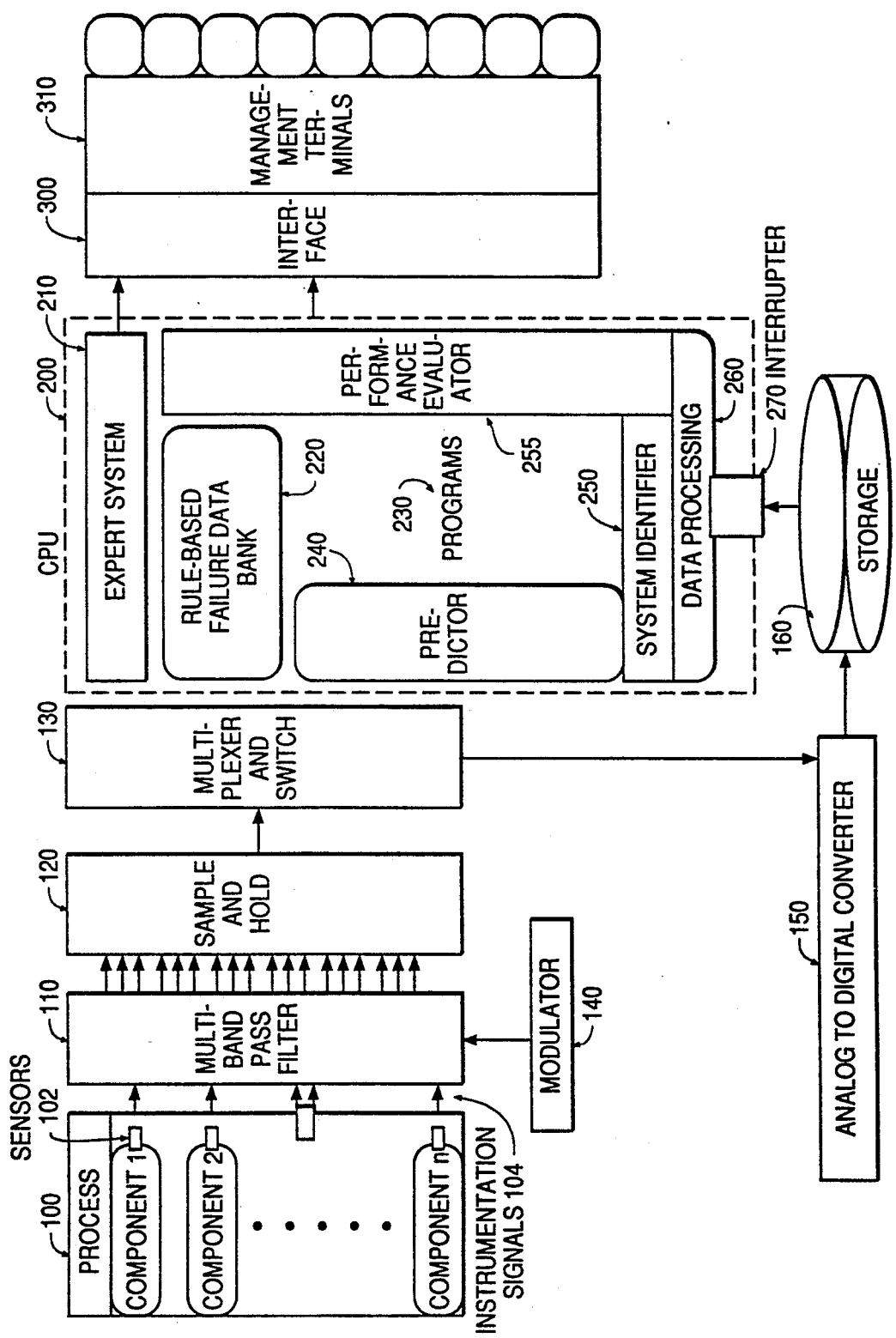
FIG. 1 illustrates schematically a wearout monitor-P process network.

The present invention utilizes information available via sensors as operational variables, such as temperature, pressure, flow, acceleration, rotational velocity, power consumption or production. Symptoms of incipient failure cause minor changes in those variables. Specific applications of failure prediction theory are known in the published literature, and have been developed for specific components such as bearings, fluid flow conduits, turbines and the like. Therefore, specific examples of failure-predicting models need not be discussed further herein. Although the changes are exemplified in instrumentation signals including the associated fluctuations thereof, the effects on the signals often go unnoticed by the human monitor. Hence, prediction of failure can be accomplished via on-line analysis of early indications of change in equipment performance. The analysis approach-involves:

performing failure modes and effects analysis on the component of interest to identify failure modes, causes and consequences, including the effects of component failure on the overall system;

constructing a rule-based model of failure modes and effects that relates changes in instrumentation signals to the failure modes and their effects;

constructing a knowledge-based model of failure modes and effects that relates changes in instrumentation signals to the failure modes and their effects;

constructing a knowledge-based model of the process and the components of concern;

synthesizing an empirical time series model from measured signals;

estimating the parameters of the empirical model through time series analysis of measured data using a dynamic estimator, such as the Kalman filter;

optimally predicting the dynamic behavior of the system and its components of interest via evaluation of the noise covariance matrix and the Kalman filter gain;

employing a feature matching algorithm to identify the empirical model parameters from the knowledge-based model; and using the rule-based expert system to identify the nature and location of failure.

The wearout monitor-P also provides a means of identification of parameters associated with aging of a specific equipment through the effects of performance such equipment on its environment. Examples of such effects are:

the impact of crud buildup on steam turbine blades which causes lack of synchronization in the rotation and may eventually lead to a disastrous breakdown;

the effect of loss of material, or material buildup, on pump impellers, leading to excessive power consumption; or sudden rise in the lubricant temperature of bearings.

Table I below is a list of the hardware components of wearout monitor-P which are usable in a preferred embodiment of the present invention.

TABLE I

| LIST OF HARDWARE COMPONENTS | | |
|---|---|---|
| SUBSYSTEM | COMPONENTS | SPECIFICATIONS |
| LEVEL I Microprocessor | keyboard, CRT 2-flexible disc drives, 8-slot backplane, HP-IB interface (insures compatibility between HP computers and peripherals) | 16/32 bit, multi-user HP-UX operating system (HP version of UNIX), 1.02M byte RAM, 16K byte of cache memory and memory management hardware, 12.5 MHz processor, with C, FORTRAN 77, and HP PASCAL compilers and Graphics [Model 236CT] |
| LEVEL II Microprocessor | 12-slot processor, 7-slot backplane, HP-IB interface, 8-channel multiplexer | 32 bit, multi-user HP-UX, 1.5M byte RAM, with C, FORTRAN 77, and HP PASCAL compilers and Graphics [Model 540AM] |
| Peripherals | Disc drives | *one 3 × 404M bytes removable media [Model 7935G] *two Winchester disc 132M |

TABLE I-continued

LIST OF HARDWARE COMPONENTS

| SUBSYSTEM | COMPONENTS | SPECIFICATIONS |
|---|---|---|
| | | bytes mass storage and a ¼" cartridge tape drive for backup and user I/O [Model 7914 P/R] |
| | Tape subsystems | 400–500M bytes of on-line storage, 1600 cpi density, 45 ips read/write speed (160 ips rewind speed), upright cabinet containing one or two magnetic tape drives [Model 7971A] |
| | Microfloppy disc drive | double sided 3½" microfloppy, dual configuration, 1420K bytes of formatted capacity [Model 9122D] |
| | Analog-to-digital converter | seven channels of 55,000-reading per second data acquisition, interface to HP-200 [Model HP 98640A] |
| Control Terminals | Data entry | multipoint communication, display memory, data verification, terminal bypass mode, keyboard [Model HP 2624B] |
| Plotter | Graphics | automatic feed, 8-pen, chart paper [Model 7550A] |
| Printers | Thermal | graphics line printer, 480 lpm, high speed listing, quick plot and graphics, 8-bit parallel [Model 9876A] |
| Data Acquisition | Multiprogrammer | Data conversion and transfer 180,000 readings per second, 15 plug-in I/O card positions [Model 6944A] |
| Programming Cards for Data Acquisition | Scanner | high speed scanner, multiplexer, analog input [Model 69752A] |
| | Memory buffer | input/output tasks w/o intervention from controller, acquisition 760K words/second transmission 400K words/second [Model 69792] |
| | Digital-analog converter | analog output [Model 69720A/69721A] |
| Display | CRT | high speed vector graphics, straight lines and curves [Model 1347A] |
| Misc. | connectors, cables, etc. | |

Table II set forth below lists ancillary hardware components for the wearout monitor-P system. It will be understood that the present invention will not be limited to the specific components or hardware employed, such being given merely as an exemplary embodiment of the present invention.

TABLE II

LIST OF ANCILLARY HARDWARE COMPONENTS

| COMPONENTS | SPECIFICATIONS |
|---|---|
| rack mount kit | for HP 6944A multiprogrammer |
| interface card | HP 98633A for interface for multiprogrammer with HP series 200 microcomputer |
| interface cable | HP 1470C, 13.2 ft. to connect interface card to multiprogrammer |
| HP-IB interface | HP 27100A for HP 500 microcomputer |
| HP-IB extender | HP 98624A allows communication between HP 200 microcomputer and 14 HP-IB compatible instruments |
| multiplexer interface | HP 27130, 8-channel for HP 500 microcomputer |

TABLE II-continued

LIST OF ANCILLARY HARDWARE COMPONENTS

| COMPONENTS | SPECIFICATIONS |
|---|---|
| graphics processor | HP 97060, an intelligent graphics processor for full access to graphics display system |

As shown in FIG. 1, analog signals 104 from instrumentation and sensors 102 associated with equipment of interest as well as of the whole process/plant 100 are transmitted to a multiband pass filter 110 to classify signals according to the range of frequencies in a manner (known in the art) that eliminates aliasing problems. A sample and hold device 120 is provided to ensure subsequent proper timing and conversion of the signal by an analog to digital converter 150. The signals are then processed by a multichannel multiplexer 130 (having a switch) that assures accurate sequential sampling for the analog-to-digital converter 150. The digital signals are sampled by a preset sampler for predetermined sampling intervals. The data is then processed and stored as indicated at storage means 160, which is preferably a disk storage means, by a CPU 200 which contains the system software and a sufficient memory. The selection of the CPU 200 can vary, dependent on the application; however, it requires sufficient capacity to carry out three processes, namely process 260 for data analysis, an expert system 210, and a performance evaluation system 255. The system preferably includes a rule-based failure data bank 220, programs 230, a predictor 240, a system identifier 250, and an interrupter 270. Examples of such a CPU 200 have been described hereinabove with reference to the computers and operating system usable with the program according to the present invention.

The outcome of the computations, modeling and prediction is directed via an interface device 300, such as is known in the art, to the process management terminals 310 or computers, which are allocated for life extension programs and maintenance management wherein overhauling, replacement, and preventive repairs are commissioned.

Figure 2:
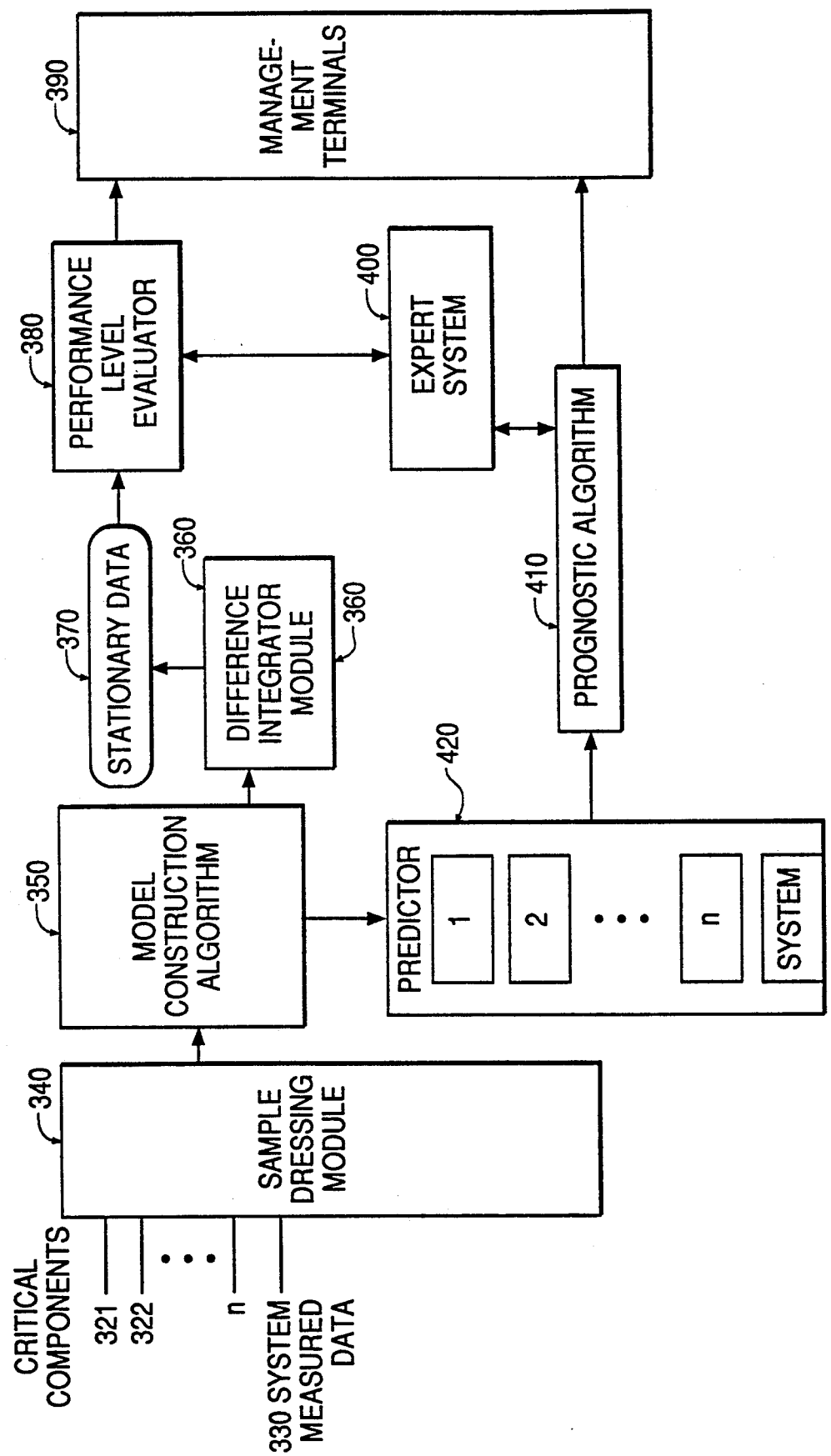
FIG. 2 illustrates a wearout monitor-P general logic diagram.

FIG. 2 shows the general logic of the wearout monitor-P system which includes six operations. Information is supplied from measured system data 330 and from critical components 321, 322, ..., n, to a sample dressing module 340 which includes sampling algorithms that prepare output data from the measurements for a model construction algorithm 350.

As seen in FIG. 2, the model construction algorithm 350 supplies signals to a predictor means 420 and to a difference integrator module 360. The module 360 supplies an output signal to a stationary data means 370 which in turn supplies the data to a performance level evaluator 380. The predictor 420 supplies predictions to a prognostic algorithm 410. The prognostic algorithm 410 communicates with an expert system 400, as well as with management terminals 390. The expert system 400 also communicates with the performance level evaluator 380. The evaluator 380 also supplies signals to the management terminals 390.

Figure 3:
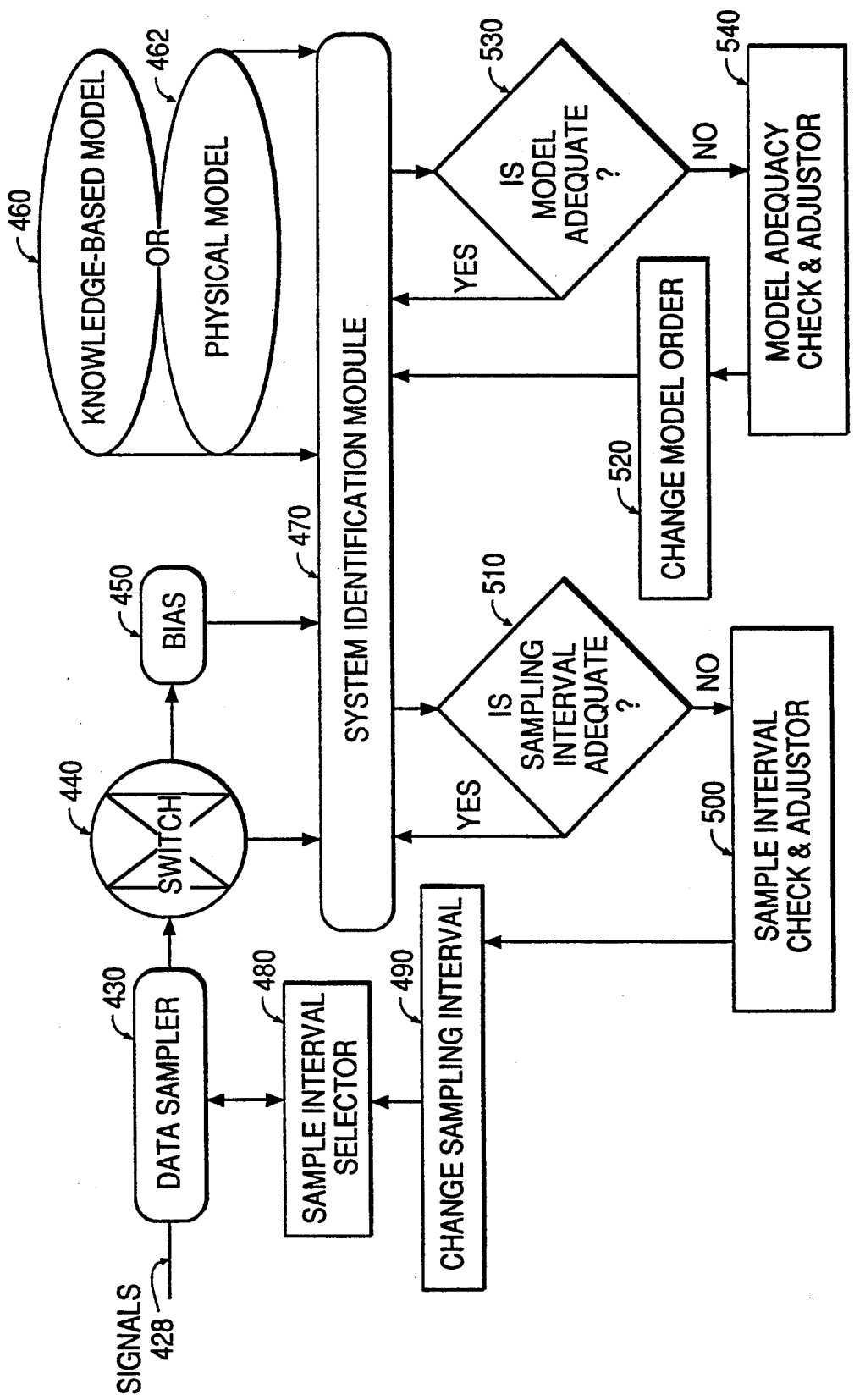
FIG. 3 illustrates a model generation strategy and a signal analysis module for a wearout monitor-P.

The filtered, digitized signals 428 are sampled by a data sampler 430, as seen in FIG. 3, according to a selected sample interval selected by an interval selector 480. The sampled signal data are employed in development of an empirical model via a system identification module 470. The model is a time series model which is initialized by either a physical model 462 or a knowledge-based model 460, the latter being the choice for systems or equipment for which physical models are hard to estimate without extreme difficulties and major approximations. Knowledge-based models are most compatible with time series analysis since they are derived from observations of system output data and control system input signals for controlling the process or system.

As shown in FIG. 3, after the signals 428 from the system and its components are sampled by the data sampler 430 and then used to identify the system/component model, a check 530 is subsequently provided to assure adequacy of the model. In case of a determination of inadequacy of the chosen model, the sample interval is adjusted at block 510 and/or the order of the model is increased until an adequate model is obtained. In preparation of the data, a bias may be used in case of a weak signal, as is known in the art.

As further shown in FIG. 3, the data sampler 430 communicates with the sample interval selector 480. The sampler 430 supplies signals to a switch 440 which in turn selectively supplies signals to either a bias means 450 (in the case of a weak signal; for a strong signal this can be omitted) or directly to a system identification module 470, depending upon the setting of the switch 440. A knowledge-based model 460 or a physical model 462 are used to input information to the system identification module 470. The system identification module 470 supplies information to a test block 530 which tests whether the model is adequate. If it is, a return is made to the system identification module. If the model is not adequate, a model adequacy check and adjustment is made at block 540, which in turns supplies an output signal to change the model order at block 520, after which a return is made to the module 470.

Separately, based upon information from the module 470, a test is made at block 510 whether the sampling interval is adequate. If it is, a return is made to the module 470. If not, a sample interval check and adjustment is made at block 500. Block 500 then supplies signals to a block 490 which changes the sampling interval, and which in turn supplies signals to sample interval selector 480 which communicates with the sample 430.

The resulting time series empirical model is then input to the predictor 420 of FIG. 2, for prediction of future states of the system. The "stationary" part of the signals (as discussed further hereinbelow) is used for performance evaluation while the outcome of the prediction process is employed in prognosis of failure by the algorithm 410. The expert system 400 contains the knowledge base required, as well as the failure data for prediction of incipient failure.

Figure 4:
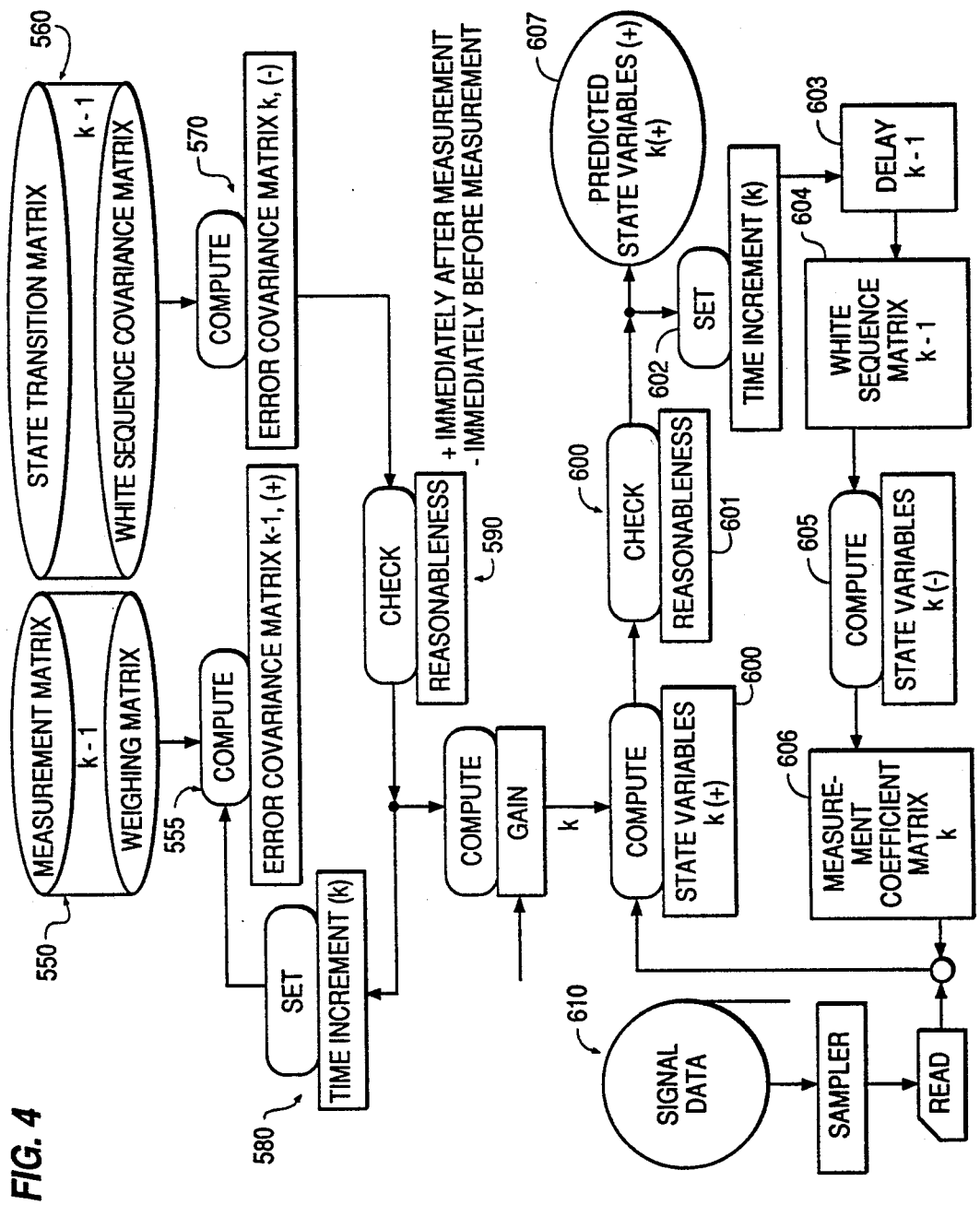
FIG. 4 illustrates a flow chart of the predictor module of a wearout monitor-P.

A computer flow diagram of the predictor is shown in FIG. 4. A predictor, such as the Kalman filter, discussed hereinabove, is employed to provide information on the states of the system and its components. In this diagram, the relationships used to provide the necessary parameters include the state model for a system corrupted with noise; that is, $$x_k = \phi x_{k-1} x_{k-1} + w_{k-1},$$

where x is the state variables vector, is the transition matrix and w presents a white noise sequence with zero mean and covariance $Q_k$, that is, $$w_k = N(O, Q_k).$$

The measurement is, $$z_k = H_k x_k + v_k,$$

whereas z is a vector representing a sequence of measurement, H is the observation matrix and v is the residual vector with zero mean and covariance $R_k$, that is $$v_k = N(O, R_k).$$

The system/component state estimate update is, $$x_k(+) = x_k(-) + G_k[z_k - H_k x_k(-)].$$

where indicates estimated values. The error covariance update is, $$P_k(+) = [I - G_k H_k] P_k(-).$$

The gain matrix is, $$G_k = P_k(+) H_k^A R_k^{-1}.$$

where superscript A refers to an adjoint matrix.

As seen in FIG. 4, a measurement matrix and weighing matrix 550 supplies information for computing an error covariance matrix at "K−1" as indicated at block 555. A state transition matrix and white sequence covariance matrix 560 supplies information for an error covariance matrix indicated at block 570. This block 570 supplies information to a means for checking reasonableness which is indicated at block 590. The output of block 590 is supplied to block 580 where a time increment is set. The output of block 590 is also supplied to a computational loop wherein state variables are computed at block 600, the reasonableness of the computation is checked at block 601, and block 607. The loop itself continues from block 602 with setting of a time increment (k) at block 602, of a delay, (k−1) at block 603, computation of a "white sequence matrix" at block 604, computation of state variables at block 605, and production of a measurement coefficient matrix at block 606, which together from signal data received from block 610 is supplied to return to the loop for computation of state variables at a time immediately after measurement.

Figure 5:
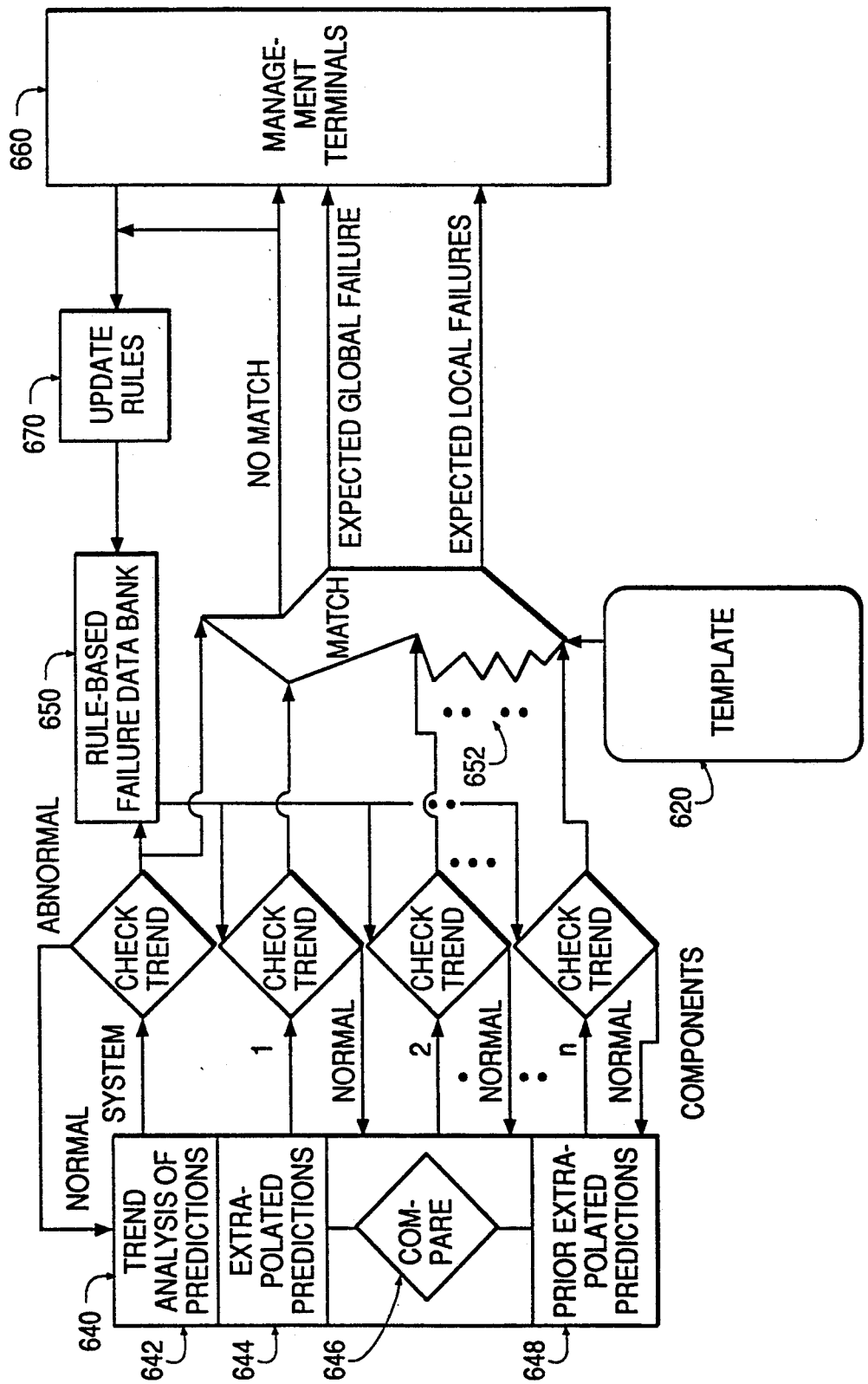
FIG. 5 illustrates a flow chart of the prognostic module of a wearout monitor-P.

As shown in FIG. 5, the predicted state of the system is compared to the prior state at block 640, 642, 644 and 646, and an output signal is provided at each step to check the trend. If the trend analysis shows abnormal conditions, the global trend is compared with the trend analysis of signals from the constituent components via the rule-based failure modes and effects data bank, indicated at block 650 in conjunction with a template 620.

The template 620 is a software entity in tabular form, which provides a failure scenario and a source of each failure. The template 620 also identifies each type of signal to identify which signal (or signals) give rise to each type of anticipated failure. The template 620 is thus a knowledge base, with information therein preferably being maintained in disk storage form. By identification of the components responsible for the abnormalities, the fault is localized. The global and local trends are used to seek a match with the data base template 620 in the expert system by signal and by component, as indicated at 652.

If no abnormalities are found in the trend from the components signal analysis, the global trend is matched to the template 620. The outcome of the matching is used to transmit a signal to the maintenance terminals, indicated at block 660. The signal will initiate the necessary command. If no match is found and the abnormalities persist, the information is provided to the maintenance management for surveillance action. The outcome of the surveillance would be added to the template and the rule-based system would be updated.

Figure 6:
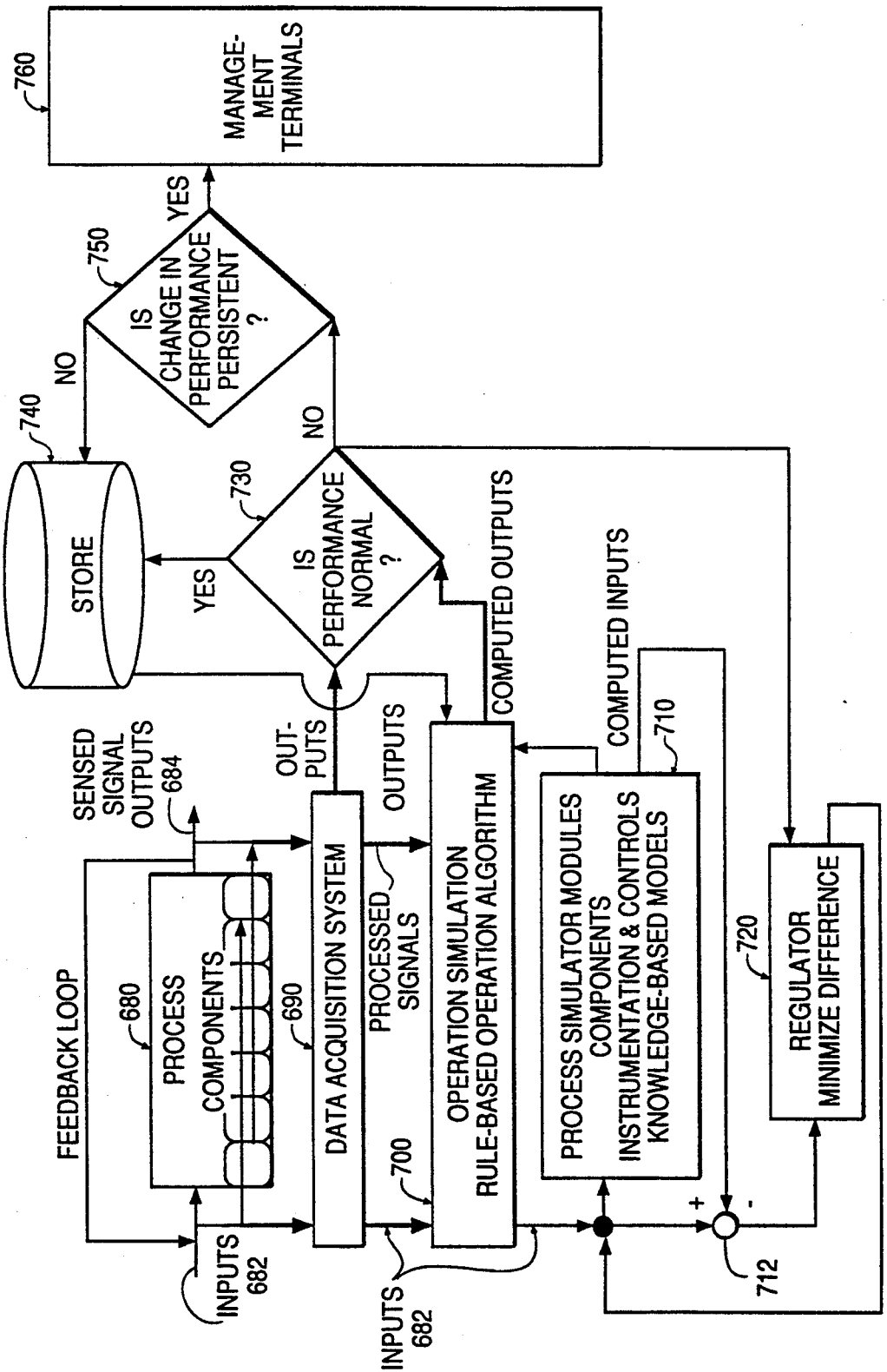
FIG. 6 illustrates performance evaluation logic used in the present invention of a wearout monitor-P.

In FIG. 6 the logic of the performance level evaluator is shown. The control signals 682 to the process components 680 are used as inputs 682, and sensed output signals 684 from the components (rotation speed, temperatures, etc.) are supplied to both a data system 690 and an operation simulation 700. An operation simulation output signal is sent to a process simulator 710 where computed output signals and computed input signals are generated. Comparison between the computed inputs and the process inputs are supplied to a "difference" module 712, which supplies the difference between predicted and actual respective signals to a regular 720 which, for relatively small differences, minimizes same by making them equal to zero. The regulator does not minimize relatively large differences, however, such differences being important to failure prognostication. Such large differences would be indicative of change in performance, especially if the deviation persisted over a length in time. By minimization of the input to the simulator from the process and the computed inputs, and following the operation rules in the operation simulation, the outputs of the simulator can be a proper reference of the process performance.

The computed outputs from the process simulator modules 710, as well as computed outputs from the operation simulation 700 are supplied to a regulator 720 which minimizes the difference as described above.

The regulator 720 also receives an input from the block 730 which tests whether the performance is normal; if not normal, the signal is sent to the regulator 720. If the performance is normal, information is stored at the storage device 740, which is preferably a hard disk storage means which forms at least a part of the expert system's knowledge base. A test is conducted at block 750 whether the change in performance is persistent. If not, information is stored at the storage device 740. If the change is persistent, information is supplied to the management terminals 760.

Figure 7:
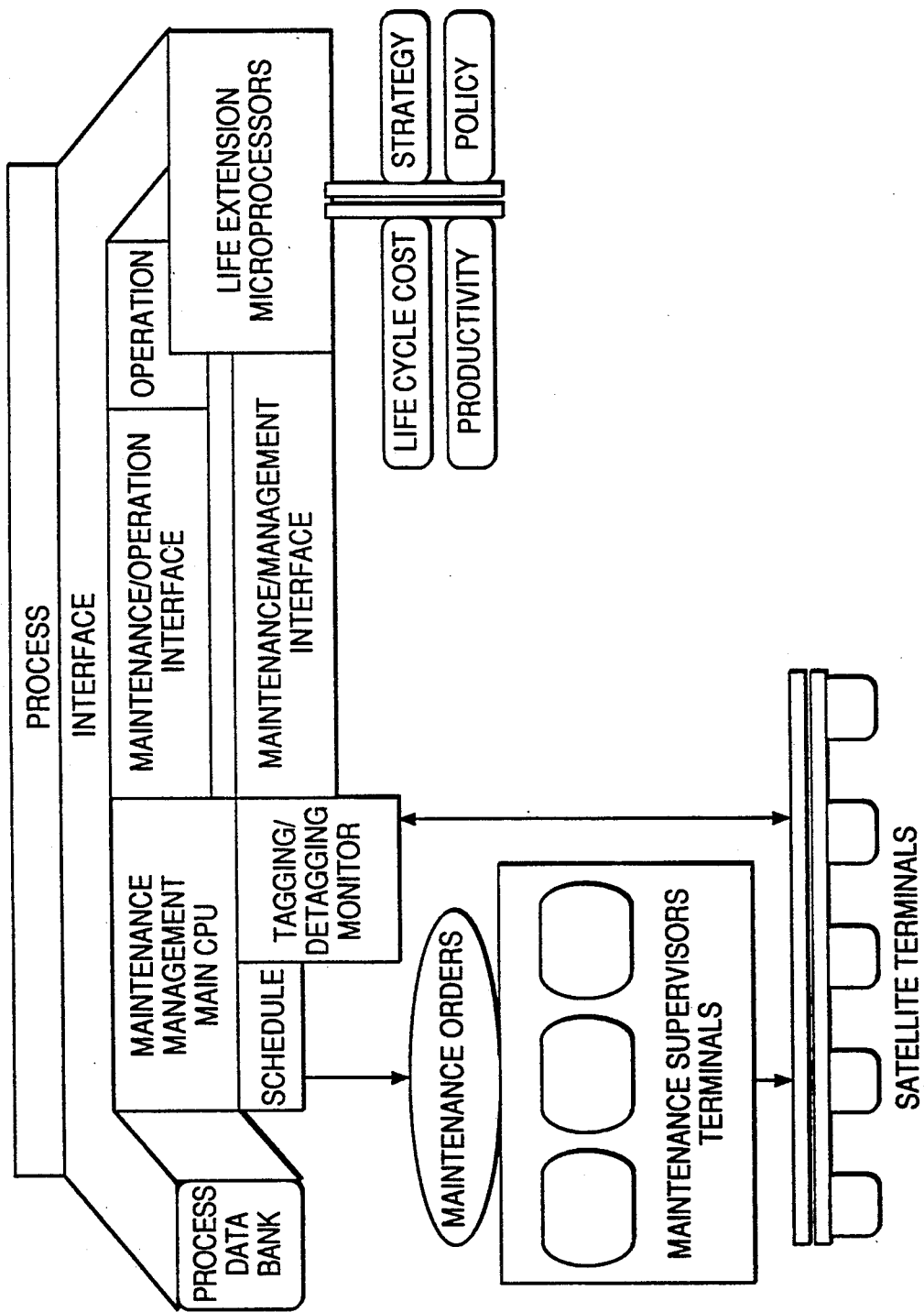
FIG. 7 illustrates management terminals for displaying the output of the wearout monitor-P system.

FIG. 7 schematically illustrates the general interaction between the maintenance supervisors' terminals, satellite terminals, maintenance orders and the process or system being observed and controlled. This figure illustrates the interaction which occurs in employing the system according to the present invention to schedule maintenance, taking into account life cycle cost, productivity, strategy and policy.

The signals from the wearout monitor are directed to the management terminals 760 from proper action as shown in FIGS. 6 and 7. The maintenance management can use the outcome of the failure prediction, as well as the output of the process data bank, to schedule the preventive maintenance action. The data bank store previous data. Processing of the tagging and detagging commands can be performed along with the maintenance orders. The results are also used by the management in planning plant life extension.

Figure 8:
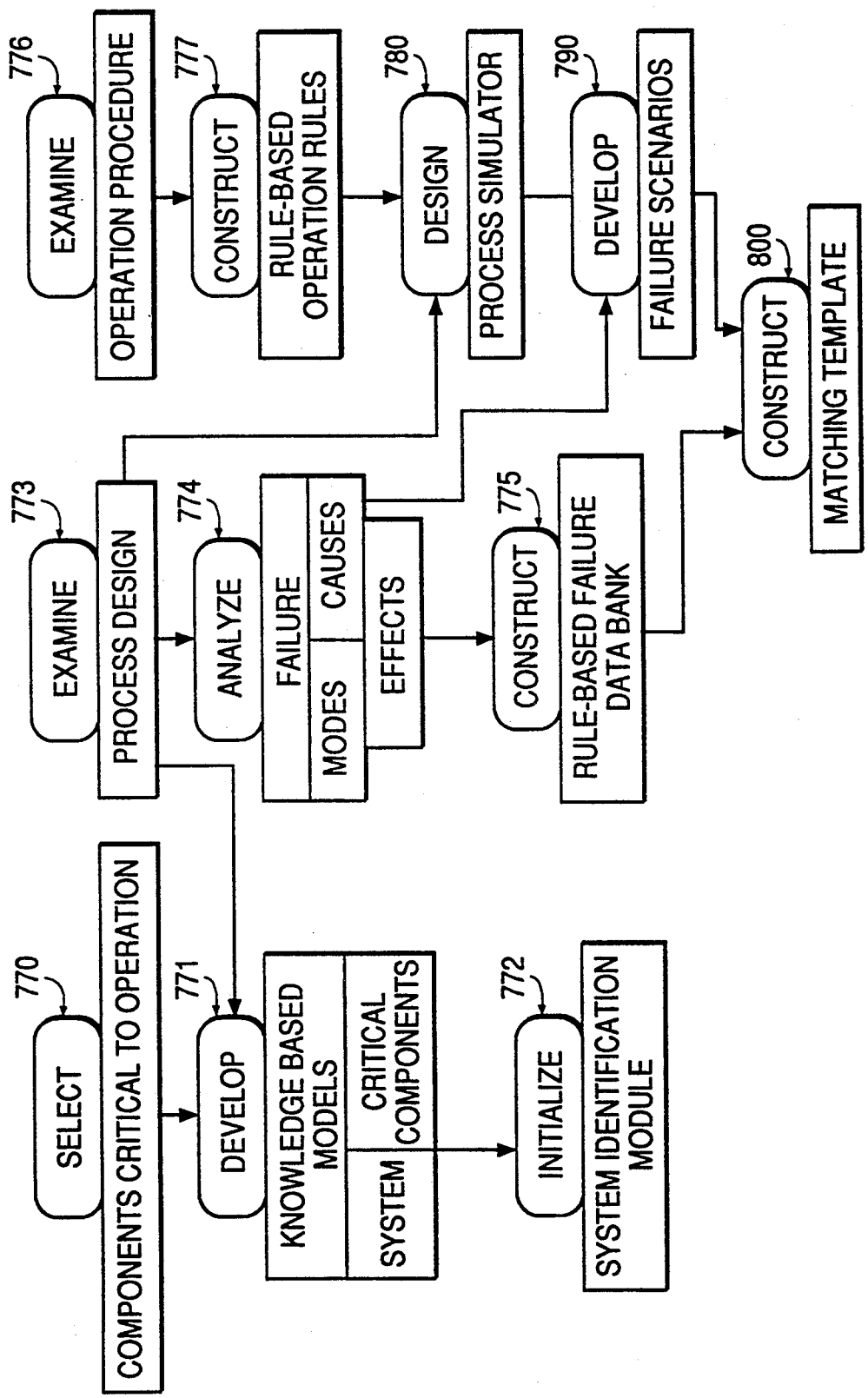
FIG. 8 illustrates an adaptation strategy of the wearout monitor-P for a specific application.

The wearout monitor-P is a generic system and may be adapted to any specific applications. In FIG. 8, therefore, the necessary preparations are shown including the structuring of the information for the expert system.

As seen in FIG. 8, selection is made at block 770 of the components critical to the operation of the system. At block 771, knowledge based models are developed of the system and of critical components for the system, for example, in a fossil fueled power plant, critical components might include forced air fans and their bearing, the steam turbine and its bearings, and the main water pump and its bearings. The system identification module is initialized at block 772.

It is necessary to examine the process design itself, as indicated at block 773, with the results being supplied to the block 771 and to block 774 where analysis is performed to determine modes and causes of possible failures for the component, as well as the effects of such failures upon the system. The product of the analysis at block 774 is supplied to construct, at block 775, a rule-based failure data bank.

The product of step 775 is supplied as information for the construction of a matching template as indicated as block 800. The block 800 also receives information relating to failure scenarios which have been developed by block indicated as 790. The block 790 receives information from the block indicated at 774 as to the causes of failure.

The operation procedure is examined at block 776, and the product of such examination is used to construct rule-based operation rules, as indicated at block 777. These rules are used to design a process simulator as indicated at block 780. The process simulator designed at block 780 also receives information from block 773 relating to examination of the processed design itself.

The matching template constructed at block 800 is used to permit matching of various symptoms of impending failure, as well as to indicate normal operation of various components, so that the actual signals from the ongoing process can be analyzed and compared with the template. For example, in the case of a forced air fan in a power plant, the template 620 could be used to detect, for example, overheating of the fan bearings, wear of the fan bearings as indicated possibly by an increase in the amplitude of measured vibrations of the fan at the bearings, and wear of the fan blades due to erosion over a period of years.

Figure 9:
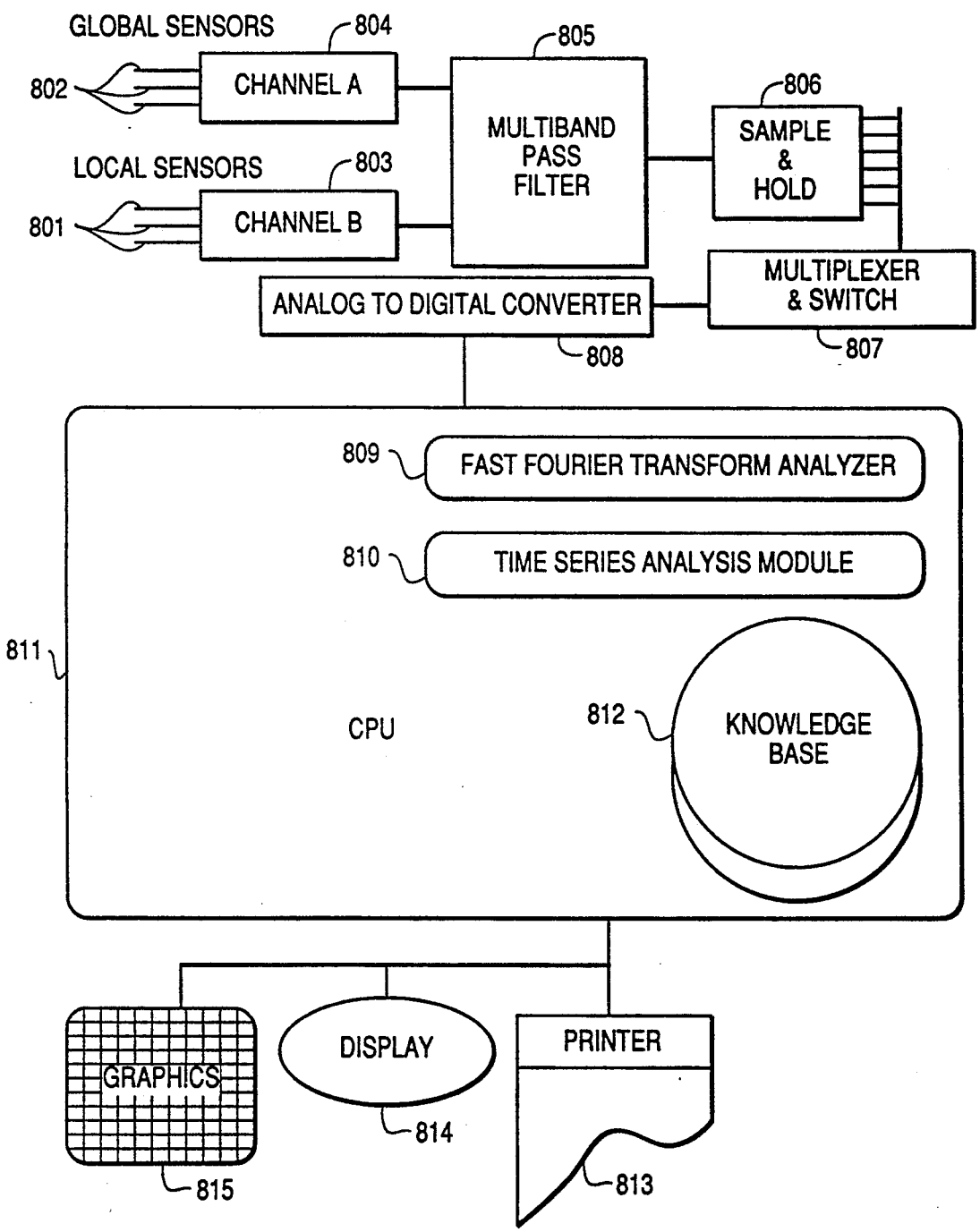
FIG. 9 is a schematic of the arrangement of the hardware for the wearout monitor-PD.

FIG. 9 shows a schematic of the hardware arrangement of components of the wearout monitor-P, which can be also used for wearout monitor-PD, comprising the leads of a plurality of multiple sensors distributed over the process critical points (local sensors 801) which provide signals to CHANNEL B 803 as well as signals from the outputs and inputs of the process (global sensors 802) which provide signals to channel A 804. Channels A and B are two independent instrumentation logic circuits which provide the input to a multiband pass filter 805 tuned to discriminate interferences in the received signals and to allow the passage of signals within a specified range of frequencies. The signals are managed by the sample and hold 806 and the multiplexer and switch 807, and are then digitized by an analog-to-digital converter 808. The signals are analyzed by a fast Fourier transform analyzer 809 using conventional hardware as that available from Hewlett-Packard and software such as ILS to analyze the frequency spectrum, or by a data processing system for time series analysis 810. A CPU 811 is used to run the prognostic and diagnostic modules to generate display signals using the rule-based expert shell and the knowledge base 812. The information displays include printout by printer 813, CRT display 814 of the process status, and a graphics terminal 815 to display the process trends.

The knowledge-base provides a rule-based expert monitoring system by providing knowledge which encompasses: data from past experience; life estimates from manufacturers; fault trees showing probability of failures of components and equipment leading to a top failure, such as the overall process failure; specification of failure modes, effects, and causes for each component.

Figure 10:
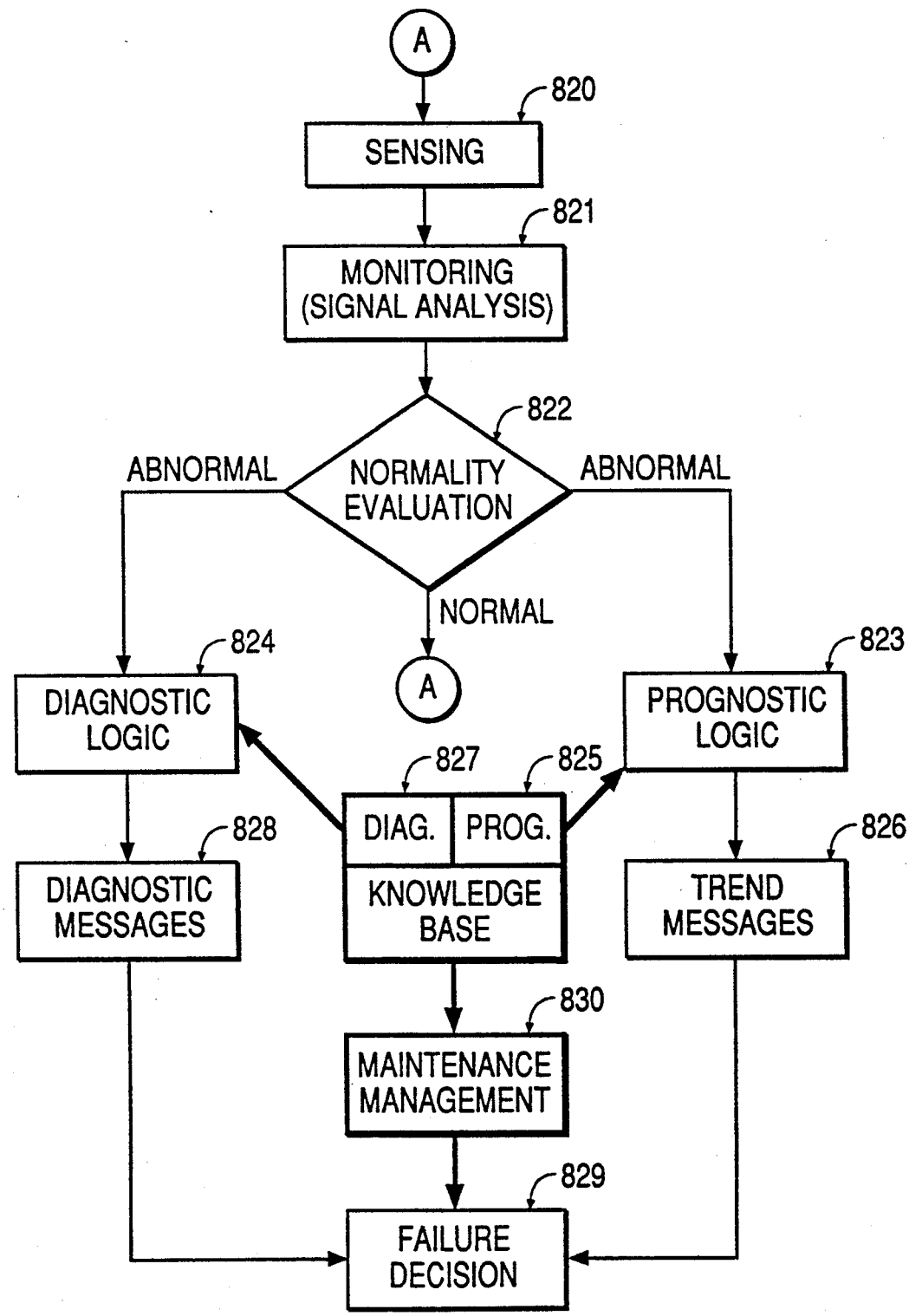
FIG. 10 is a functional diagram of the prognostic/diagnostic scheme used in wearout monitor-PD.

FIG. 10 illustrates a schematic representation of the functional diagram of the wearout monitor-PD which is configured to deal with different failure classification and characteristics including: permanent/intermittent, complete/partial, sudden/gradual, dangerous/safe, wearout/inherent/misuse, isolated/interactive, independent/interdependent or any combination thereof. The monitoring process starts with block 820, sensing signals from the process followed by signal analysis in block 821. According to the analysis the process is found normal or abnormal in the decision block 822. If normal, the process returns to block 820; if not, the diagnostic and prognostic task starts in parallel which provides a redundancy in the fault-search scheme. The diagnostic and prognostic mechanisms are designed by different logics and are supported by different knowledge bases. During the operation of the wearout monitor-PD procedure, the monitoring system acquires a variety of signals from instrumentation subsystems in block 820 and extracts individual features of the signals in block 821 and distributes appropriate information in block 822 to the prognostic logic 820 diagnostic logic 824.

The prognostic logic 823 assesses a combination of symptomatic features which are compared to classified patterns in the prognostic data base 825 to provide by trend analysis a message 826 in the state of the component. The diagnostic logic 824 employs a diagnostic knowledge base 827 to provide a diagnostic message 828. Failure recognition in block 829 is then based on the trend and the diagnostic messages and may utilize input from a maintenance management schedule 830. In dealing with a specific fault, the diagnostic and prognostic logics may not work simultaneously but act as a redundant monitoring system wherein if the prognostic logic fails to identify an incipient failure the diagnostic logic may identify the presence of a defect.

Figure 11:
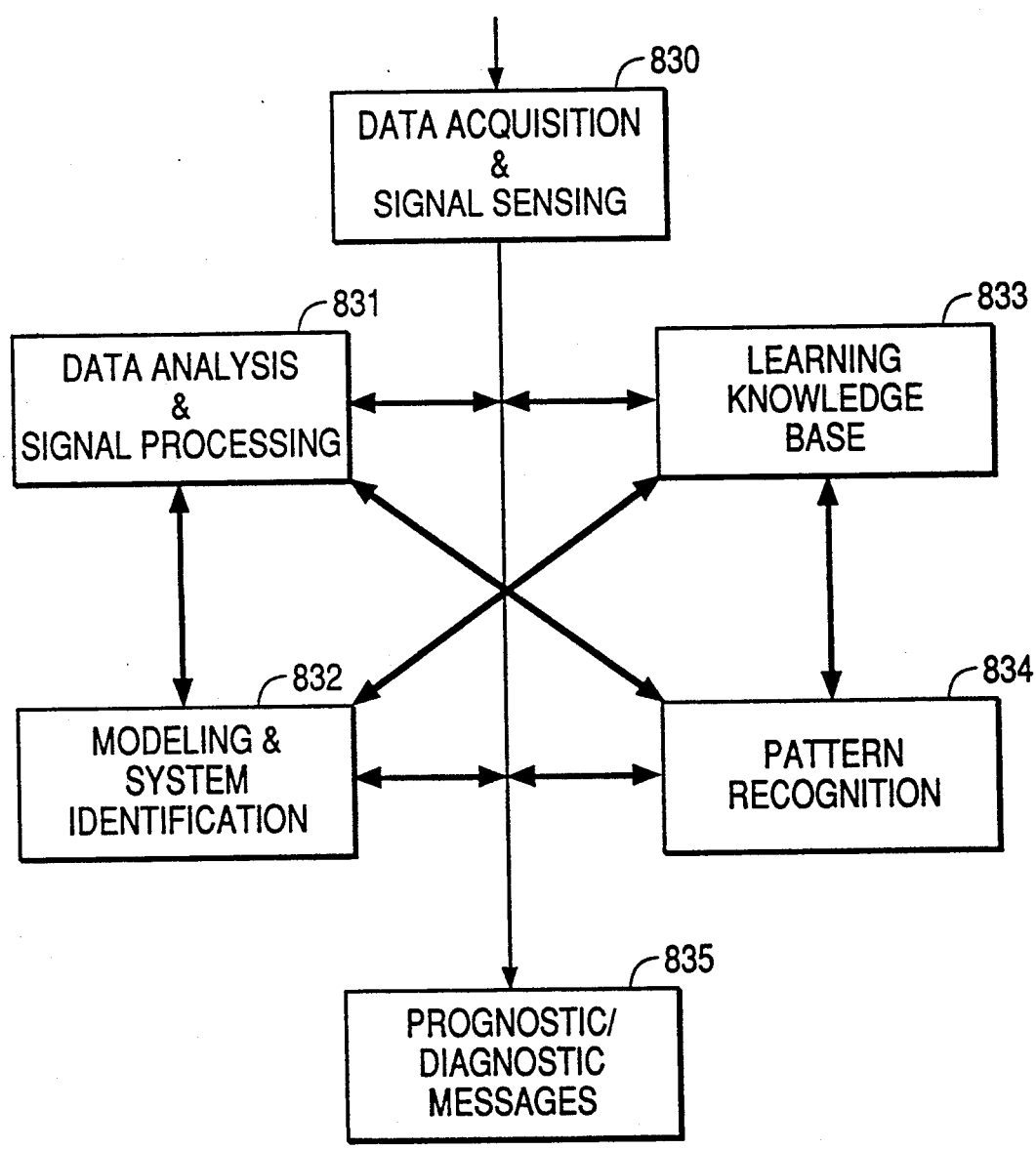
FIG. 11 is a block diagram representing prognosis and diagnosis of a defect.

FIG. 11 is a block diagram of the prognostic/diagnostic mechanism along with the selected components, analytically decomposed into several modules: a data acquisition and signal sensing module 830, a data analysis and signal processing module 831, a modeling and system identification module 832, a learning knowledge base module 833, a pattern recognition module with matched filter 834, and messages from the prognostic and diagnostic logic 835.

The data acquisition and signal sensing module 830 is critical for reliable protection and efficient prognostics/diagnostics of equipment. Several signals can be measured and processed fast and accurately. Selection of sensors is a crucial part of the prognostic/diagnostic monitoring system. The sensors should only measure the required specific physical parameters and remain insensitive to all other parameters. Retrofitting the sensors in a system should require no or very minor modification of the equipment to be monitored; sensors should be reliable and accurate. Calibrating and testing procedures should be easy. Cost of sensors, signal processors and ancillaries should be as low as possible. Basically, the number of sensors installed in equipment should be as small as possible, but care should be taken to avoid losing information because of inappropriate selection or placing of those sensors. Computer-based systems can display a certain amount of intelligence based upon cross-examination of numerous signals collected from sensors and the knowledge of relationships between these signals. Such cross-examination may indicate malfunctioning of sensors or confirm validity of measurements.

The data analysis and signal processing module 831 can utilize various types of signals. Vibration signals are the most commonly used for data processing. Those signals can provide various failure indices through different techniques of signal analysis. Available techniques can be roughly categorized into time domain approaches, such as overall level or root mean square (RMS) and crest factor monitoring; shock pulse and Kurtosis analysis; and band pass filtering. Frequency domain approaches include Octave, ⅓ octave and narrow band, Cepstrum, and sum and difference frequencies analysis; synchronized time domain averaging; and high frequency resonance technique. The purpose in processing a vibration signal is to obtain a more convenient or more useful representation of the information carried by the signal. Currently, the methods which are most widely applied to monitoring in the industry rely on spectral analysis in one form or another. Different windowed waveforms for the vibration signals involve either explicitly or implicitly certain manner of spectral representation. For example, short-time energy and average magnitude, short-time zero crossing rate, linear smoothing, nonprognostic linear smoothing, and short-time Fourier analysis are the most popular techniques used for spectral analysis.

The same signals measured from the sensing system and analyzed by the data analysis, and the indices used in the process of signal analysis can be expanded by using the modeling and system identification module 832 to provide trend analysis and a capability of forecasting in a parametric form. The modeling techniques identify the system characteristics from the measured data, as well as predict the system behavior in the future. Various statistical methods have been applied for system identification. The most adequate approach for on-line or off-line monitoring is the time series model. Autoregressive moving average (ARMA) model is appropriate for dependent data monitoring, whereas autoregressive (AR) model is a special case of ARMA model which is more suitable for on-line detection. The different indices which result from the analysis of both normal and abnormal conditions are suitable indicators for the results of prognostics/diagnostics.

The pattern recognition module 834 involves a combination of signal processing and system modeling and is sensitive to the classification of each failure mode. Pattern recognition involves the steps of feature extraction, classifier design, classifier training, and matching filter.

Feature extraction is based upon estimation techniques to generate indices by manipulating the sensed data in time and frequency domains. For example, dealing with a vibration signal, frequency, damping factor, amplitude of the resonance, energy dispersion, autocorrelation function, etc. can be the types of indices. Finding those characteristics of each index which show significant relationship with the failure mode is the most important aspect of pattern recognition.

Classifier design provides means to use various techniques of pattern recognition to categorize and determine the boundaries between different conditions by means of linear discriminant functions. A set of measurements characterizing a pattern are used to classify the pattern into one of a finite number of categories.

Classifier training is equivalent to finding the coefficient set of the linear discriminant function using available data. The coefficient set should be obtained by defining and minimizing the criterion function if the solution exists.

Figure 12:
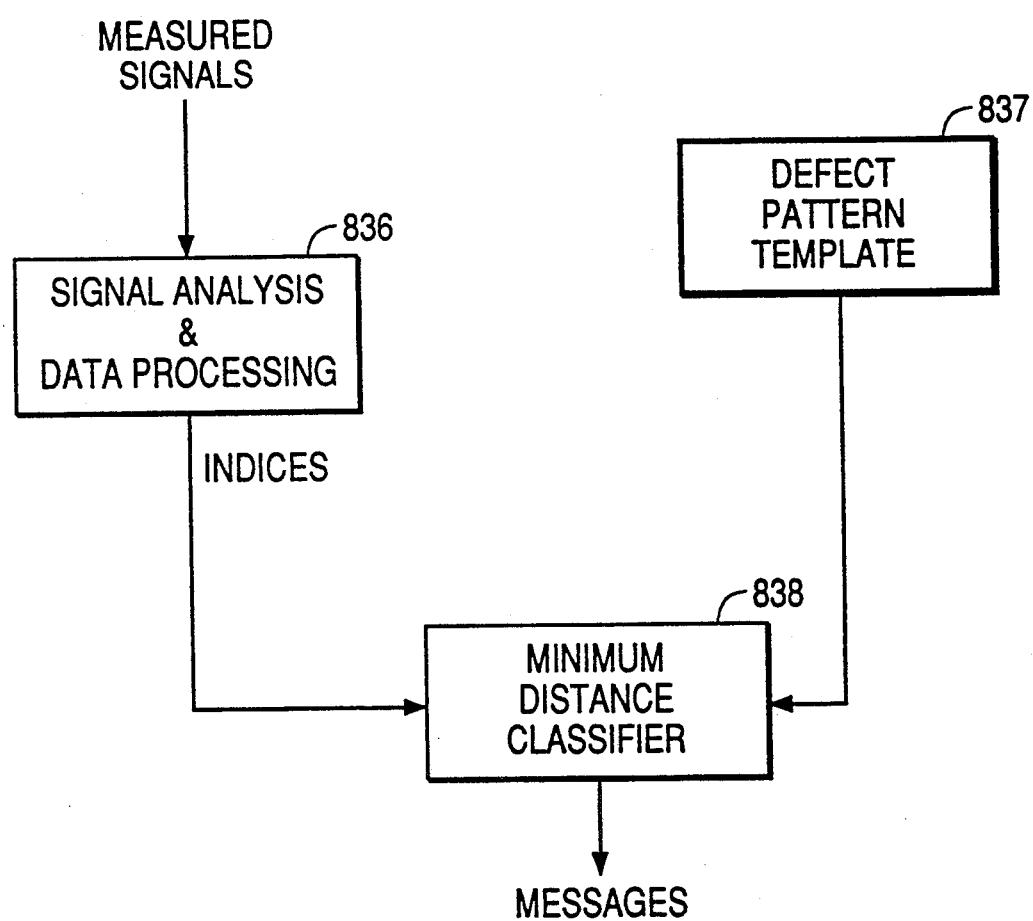
FIG. 12 is a block diagram representation of a matching filter.

Match filtering is based on the known properties of the original signal as provided by the signal analysis and data processing module 836 since it compares the signal features to the patterns prestored in a template 837 of the knowledge data base as depicted by FIG. 12. Consequently, a pattern is identified by picking the feature with nearest neighborhood through a minimum distance classifier 838.

In the learning knowledge base, results of failure mode analysis are stored for specific equipment, such as bearings or gears using a well-configured knowledge base with learning and updating capabilities. The information stored on the template 837 (FIG. 12) originally relies on the human knowledge and experience. In addition to that, the results of modeling and pattern recognition provide the updated information for the template. And the learning system be implemented by the support of, for example, Bayes decision theory.

Figure 13:
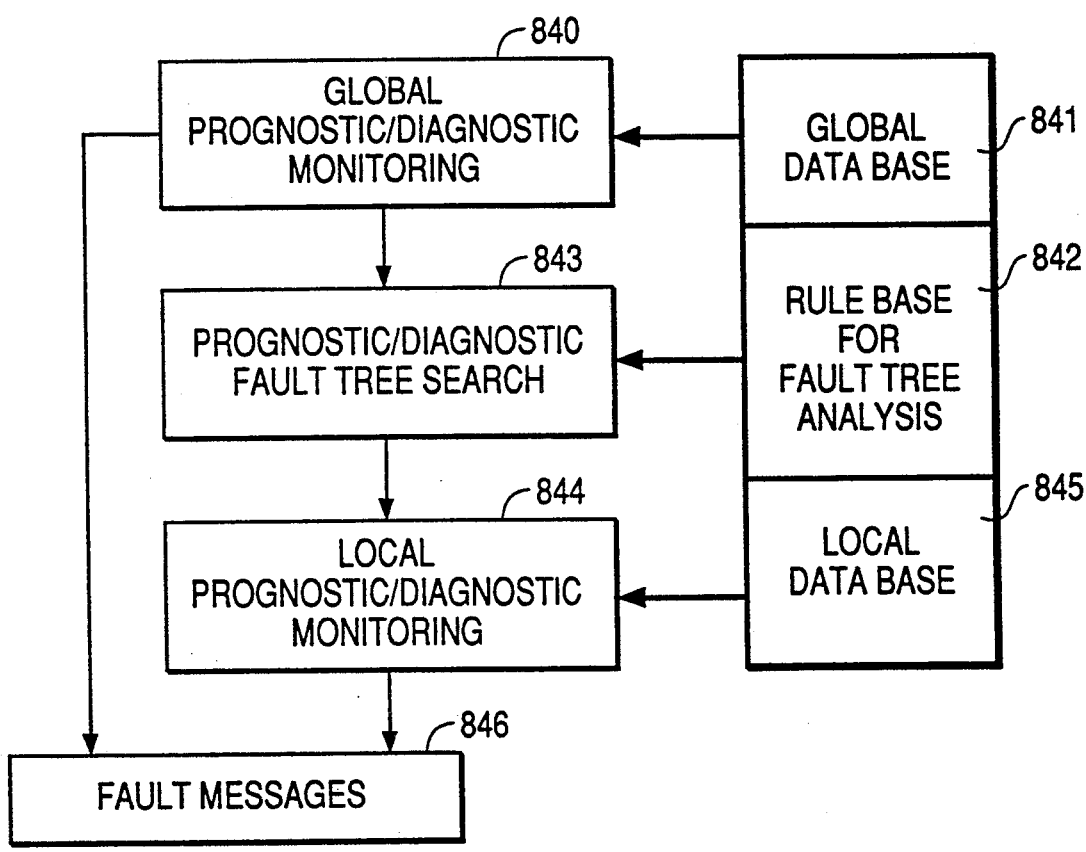
FIG. 13 is a logic diagram of the wearout monitor-PD.

The overall logic of the wearout monitor-PD is shown in FIG. 13 wherein a global prognostic/diagnostic monitoring module 840 identifies system faults in an overall format using a global database 841. Then a rule-base established for fault tree analysis 842 provides the information to search for the local defects in the component (block 843) and the local monitoring module 844 uses a local data base 845 to detect the components fault in a specific manner. Finally, the fault messages are obtained by synthesis of the outcome of the global and local monitoring modules in block 846.

As seen from FIG. 13, once abnormal conditions are suspected, models are developed for the whole system to generate global indices (GIFI) each of which corresponds to a defect or a failure mode. Each index is compared to a pattern classifier embedded in a global database by a feature marching machine. A recognized defect is then forwarded to a fault tree search. In case no match is present, an alarm is displayed to the operator. This situation would require surveillance testing of the equipment to identify the root causes of abnormality or failure.

Figure 14A:
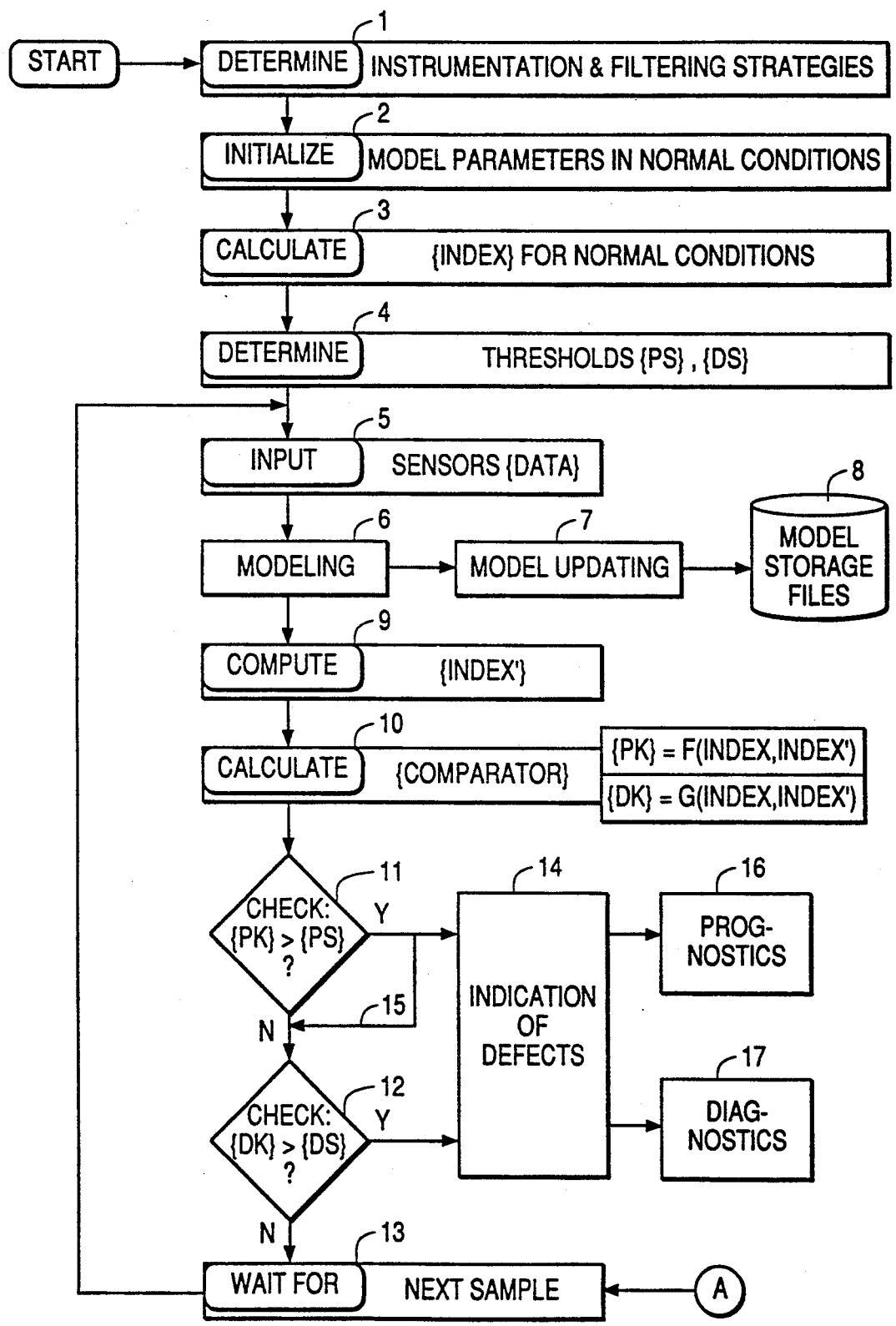
FIG. 14A and 14B illustrate a flowchart of the algorithm of FIG. 13.
Figure 14B:
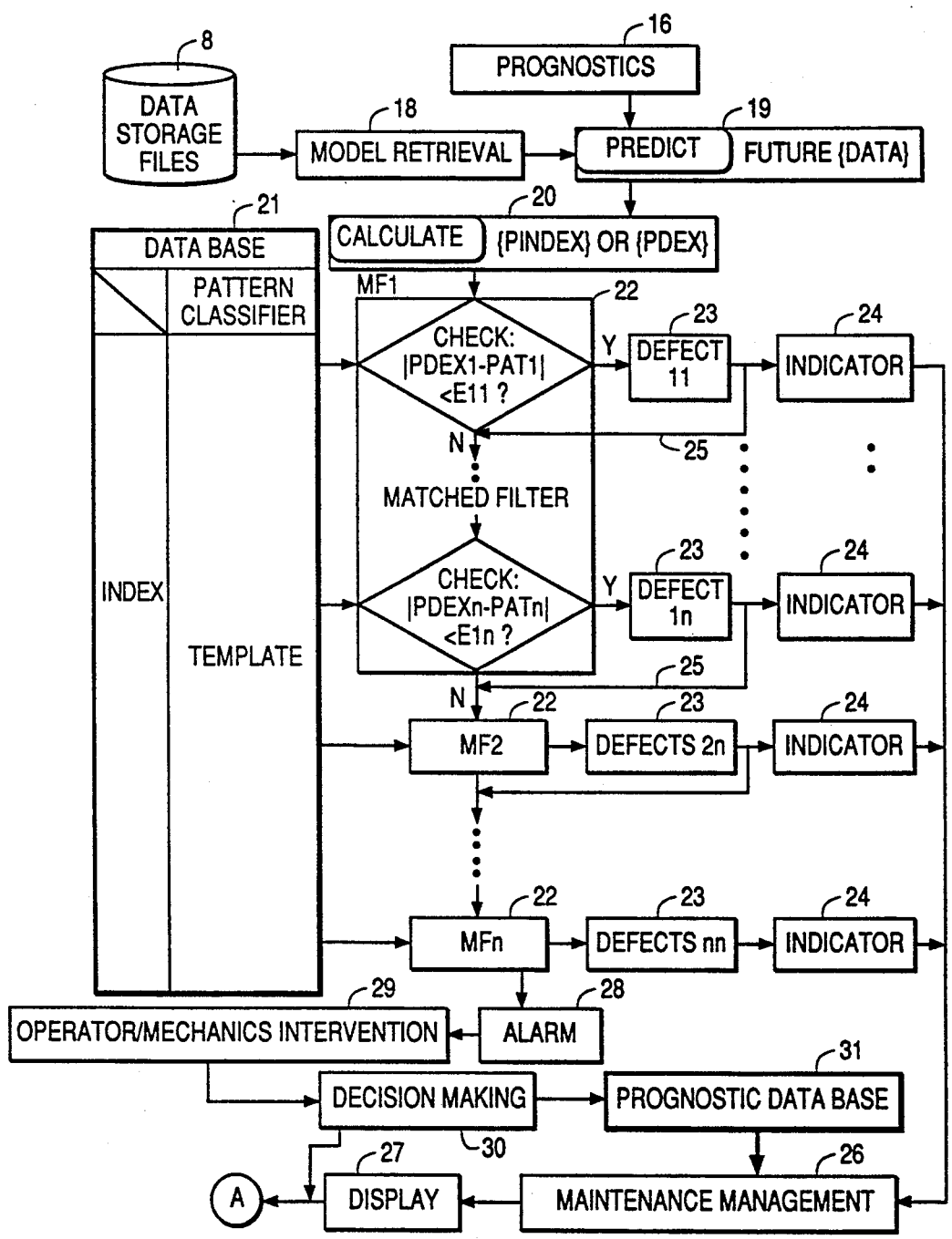

FIG. 14 shows the detailed logic diagram of the wearout monitor-PD process. At the start of the process, a strategy for locating and distributing the sensors is developed and filtering bands are selected. The initial conditions are then established by providing a reference model based upon historical data or analysis of normal signal data prior to any anticipated or degradation. The results of the analysis are used to construct an incipient failure index (IFI) which is in essence a composite of indices representing the state of the system. The wear-out monitor-PD of the present invention is constructed in a generic form and hence various analysis modules are used to provide a wide range of indices. Dependent on the equipment to be monitored a proper index would be one of a summation of, or a product of, various indices which are characteristic of the analysis scheme and the equipment to be monitored.

The set up of the process starts by Step 1 to determine the adequate sample size, sampling frequency, and filtering strategy and proceeds in Step 2 to initiate the model parameters by fitting the data in normal conditions; and then to Step 3 to select the INDEX vector that contains incipient failure index (IFI) which is sensitive to the malfunctions, and calculate the INDEX vector in normal conditions. A threshold value IFT is established in Step 4 to set the threshold vectors (PS) and (DS) for prognostics and diagnostics respectively, or a value demarcating the commencement of failure or degradation symptoms based on information in the knowledge base, such as theoretical models, experience or best estimates. The threshold of incipient failure is represented by the ration of the IFI value at commencement of failure to the IFI value at normal state of the equipment.

Once the initial conditions are established in Step 1 through 4, the prognostic/diagnostic mechanism is implemented on-line iteratively from steps 5 through 31.

In Step 5 the INPUT DATA vector is measured from various sensors and the signal data is analyzed in Steps 6 through 15 by fast Fourier transform analysis and time series analysis to produce a new index $(IFI)_{new}$ contained in the vector (INDEX'). The analysis proceeds with Step 6 to estimate the model parameters in the monitored conditions; Step 7 to update the model parameters for the monitored conditions; Step 8 to store the model parameters in the model storage files; Step 9 to compute the INDEX' vector in the monitored conditions; Step 10 to calculate the values of comparator vectors PK and DK for prognostics and diagnostics respectively, where: $PK_i = f_i$ (INDEX,INDEX'), and $DK_i = g_i$(INDEX,INDEX'); Step 11 to check the validity of prognostic index, i.e., $PK_i \leq PS_i$, i=1,..., n; Step 12 to check the validity of diagnostic index, i.e., $DK_i \leq DS_i$, i=1..., n. That is, the algorithm computes the quotient of $(IFI)_{new}/(IFI)_{normal}$ and compare it to the threshold value IFT. If the quotient is less than IFT, the equipment is normal and the analysis continues through Step 13 to wait for the next sample since no abnormality exists for prognostics/diagnostics evaluation. If the quotient is equal or is in excess of IFT, the status of the equipment to be monitored is abnormal, and the command is directed to Step 14 to represent the indication of abnormality if any one of the checking criteria for prognostics/diagnostics is violated, and Step 15 to implement the prognostic and diagnostic monitoring sequentially and in parallel, i.e., check the validity of diagnostic index under the detections of prognostic faults.

The prognostic scheme is performed from steps 16 through 31. The diagnostic scheme implements the same logics of prognostic scheme but with different knowledge base. The steps are:

16. invoke the prognostic functions;
17. invoke the diagnostic functions;
18. retrieve the model parameters from the model storage file for predicting future faults;
19. predict the future DATA vector;
20. calculate more specific index PINDEX vector for the failure pattern recognition;
21. store and provide the pattern classification of each index;
22. perform the pattern recognition through a series of pattern evaluations in the matched filter (the pattern evaluation of each index, and different matched filters MF2, ... MFn follow for evaluating different indices);

23. identify the possible types of defect;
24. indicate the possible types of defect;
25. check the possible failure of alternatives if one defect has been prognosed;
26. manage the maintenance scheme if the prognostic failures are identified;
27. display the information of prognostic failures and correct compensation;
28. sound the alarm showing that the prognostic mechanism and its knowledge base is unable to deal with this potential fault;
29. require the technical intervention of operator or mechanics;
30. make the decision by operator or mechanics; and,
31. supplement the technique experience into the prognostic database for future usage.

The fault tree search logic compares the global defect to a local database constructed for each component. Should a match be made with any of the failure pattern classifiers in the database of Step 21, a fault message is annunciated to the operator giving exact mode of failure. If no match is made, an amber light indicator is energized to indicate a problem that needs further investigation. New faults are then incorporated in the databases as part of the learning scheme. It may be necessary to shut down the machine and replace the equipment if the potential failures are serious.

The analysis schemes incorporated in the wearout monitor-PD and its modules include: frequency domain trend analysis, such as high frequency resonance analysis, signal averaging analysis, and sum and difference frequencies analysis techniques; time domain trend analysis, such as the Kurtosis analysis and the shock pulse monitoring techniques; and time domain parametric analysis, such as the time series analysis approach. Most of these techniques are familiar in the field of system identification and are briefly presented.

Periodically, a defect in a rolling element makes contact under loaded conditions and a vibration impulse is generated. The impact caused by the defect usually excites a resonance in the machine at a much higher frequency than the vibration generated by other machine elements. Modulation of the resonance by the characteristic defect frequency can possibly detect the presence of a defect by the excitation of the resonance and locate the source of the defect. Several indices embedded in the high frequency resonance technique are useful such as: the narrow band filtering which tunes the characteristic defect frequencies of rolling elements, the crest factor which checks the ratio between the peak and the average energy values of the total envelope signals, and the envelope spectrum which is used to calculate and extract the amplitude of the spectrum at the characteristic frequencies for defects in rolling elements.

Other frequency domain trend analysis techniques include the signal averaging technique which consists of averaging consecutive segments of the signals. Each two consecutive segments are one period apart wherein the period is the inverse of the characteristic defect frequency of the rolling element. In another technique, the sum and difference frequencies is generated by truncating of dual frequency excitation resulting in a beat phenomenon. The phase relationship between the two frequencies depends on how far apart the defects are. Sum and difference frequencies of rotating equipment involving spin frequencies and shaft revolution identify the location of defects. The number of sum and difference frequencies increases as the defect increases in size due to the severity of the beat waveform truncation.

Time domain trend analysis is usually performed by measuring of the kurtosis (the fourth moment of the deviation from Gaussian distribution normalized by the square of the mean square) which provides an early indication of damage at low frequencies. Comparison between the peak counts (peak acceleration) of measured signals and those of signals with Gaussian amplitude distribution provides a measure of incipient failure in the shock pulse monitoring technique.

Time series analysis using dynamic data provides a systematic approach to develop relevant empirical mathematical model of mechanical equipment using observed operation data in the form of a stochastic difference equation representing the autoregressive (AR) model which is most appropriate for on-line monitoring. The model may be represented by, $$x_t = \sum_{i=1}^{n} \phi_i x_{t-i} + a_t,$$

where $x_t$ is the time series, $a_t$ is the residual with variance $\mathrm{Var}(a_t) = \sigma a^2$ and expected value $E(a_t) = 0$, and $\phi_i$ are the autoregressive parameters.

If the adequate signal is available, the power spectrum, $S(f)$ can be obtained from the model parameters by transmission, that is, $$S(f) = \sigma_a^2 \Delta / \{\gamma 0 | 1 - \phi_1 \exp(-j2\pi f \Delta) - \cdots - \phi_n \exp(-j2\pi f \Delta n)|^2\},$$

where $\Delta$ is the sampling interval in seconds and $\gamma$ is the autovariance function with zero lag.

The fitted model AR(n) has the eigen equation, $$\lambda^n - \sum_{i=1}^{n} \phi_i \lambda^{n-i} = 0,$$

where $\lambda$ are the characteristic roots of the autoregressive function and the complex conjugate characteristic roots $(\lambda, \lambda^*)$ represent the dynamic models generated by vibration sources, for example, of the equipment. The total energy of the vibration signal in this case is, $$\gamma 0 = \sum_{i=1}^{n} \sum_{j=1}^{m} g_i g_j \sigma_a^2 [1/(\lambda_i \lambda_j)],$$

where $$g_i = \left\{ 1 / \left[ \prod_{k=1(k \neq 1)}^{n} (1 - \lambda_k / \lambda_j) \right] \right\}$$

Therefore, the significant indices obtained from time series modeling are,

The normalized residual sum of squares $= \sigma a^2 / \gamma 0$;

Natural frequency, $f_n =$ $$(\pi/\Delta) \sqrt{\{\ln(\lambda \lambda^*)\}^2 + 4\{\cos^{-1}[(\lambda + \lambda^*)/(\sqrt{\lambda \lambda^*})]\}^2} \; ;$$

Damping factor =

-continued $$\{\ln(\lambda\lambda^*)\}\sqrt{\{\ln(\lambda\lambda^*)\}^2 + 4\{\cos^{-1}[(\lambda + \lambda^*)/(\sqrt{\lambda\lambda^*})]\}^2} \ ;$$

Peak harmonics can be inspected from the spectrum diagram; and the energy dispersion ($P_i$) can be calculated based on the percentage of each mode contributing to the total energy, that is, $$P_i = \sum_{j=1}^{n} g_i g_j \sigma_a^2 [1/(1 - \lambda_i\lambda_j)]_{\gamma 0}\} \times 100\%.$$

Figure 15:
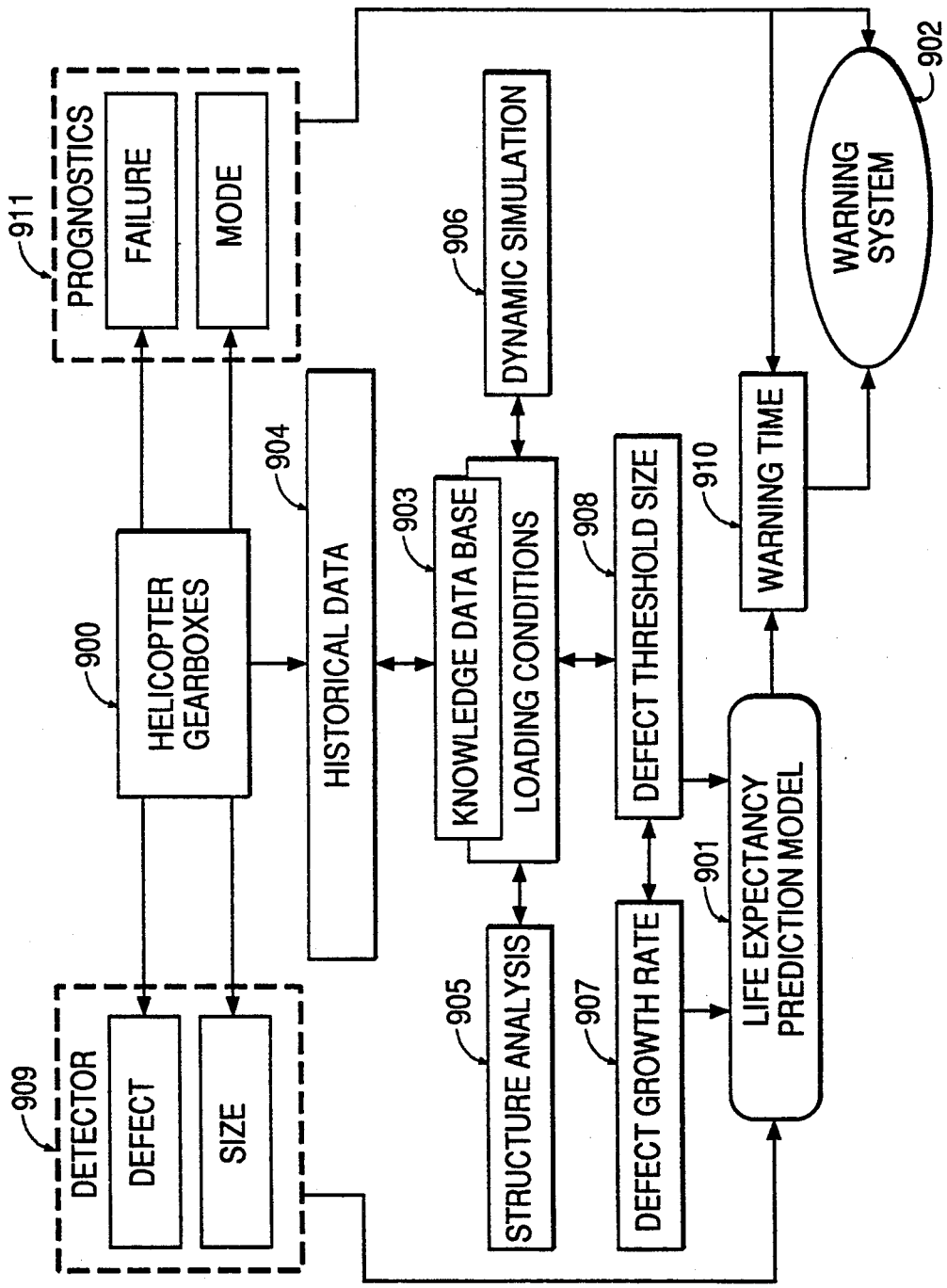
FIG. 15 is a functional definition of the life expectancy prediction model of wearout monitor-L.

A flow diagram of the functional definition of the prediction capability of the wearout monitor-L is shown in FIG. 15 for the helicopter gearboxes 900, as an example of rotating mechanical devices. The diagram shows the interrelationship between the life expectancy prediction model 901, the warning system 902, and the knowledge data base 903, generated from data collected on the gearbox under various loading conditions, including historical data 904 as it relates to previous documented performance and experience of pilots and ground crew, structural analysis 905 of the gearbox mechanism, and dynamic simulation 906 of the gearbox in a field setting. The life expectancy prediction model is constructed from predetermined data on defect growth rate 907 and related defect threshold size 908 of each defect. The model then uses indication of defect size detector 909 to provide the warning time 910.

The capability of wearout monitor-L to predict life expectancy involves integration of fault detection, monitoring, diagnostics, and prognostics 911 with the warning time 910 to provide a complete warning system 902. The implementation requires assessment of the causes, modes, and effects of bearing and gear damages including those caused by wear and fatigue. Available diagnostic techniques for detection of defects of gearbox components provide identification of the size of detectable defects and can be used in input indications to the life expectancy system.

In order to relate the size of a defect which can be detected to the amount of warning time which remains before the gearbox can no longer transmit the required operating power, the prediction model for life expectancy involves identification of the nature of different failure modes, determination of the stress/strain distribution, and derivation of an accumulated damage and defect propagation model for estimation.

Figure 16:
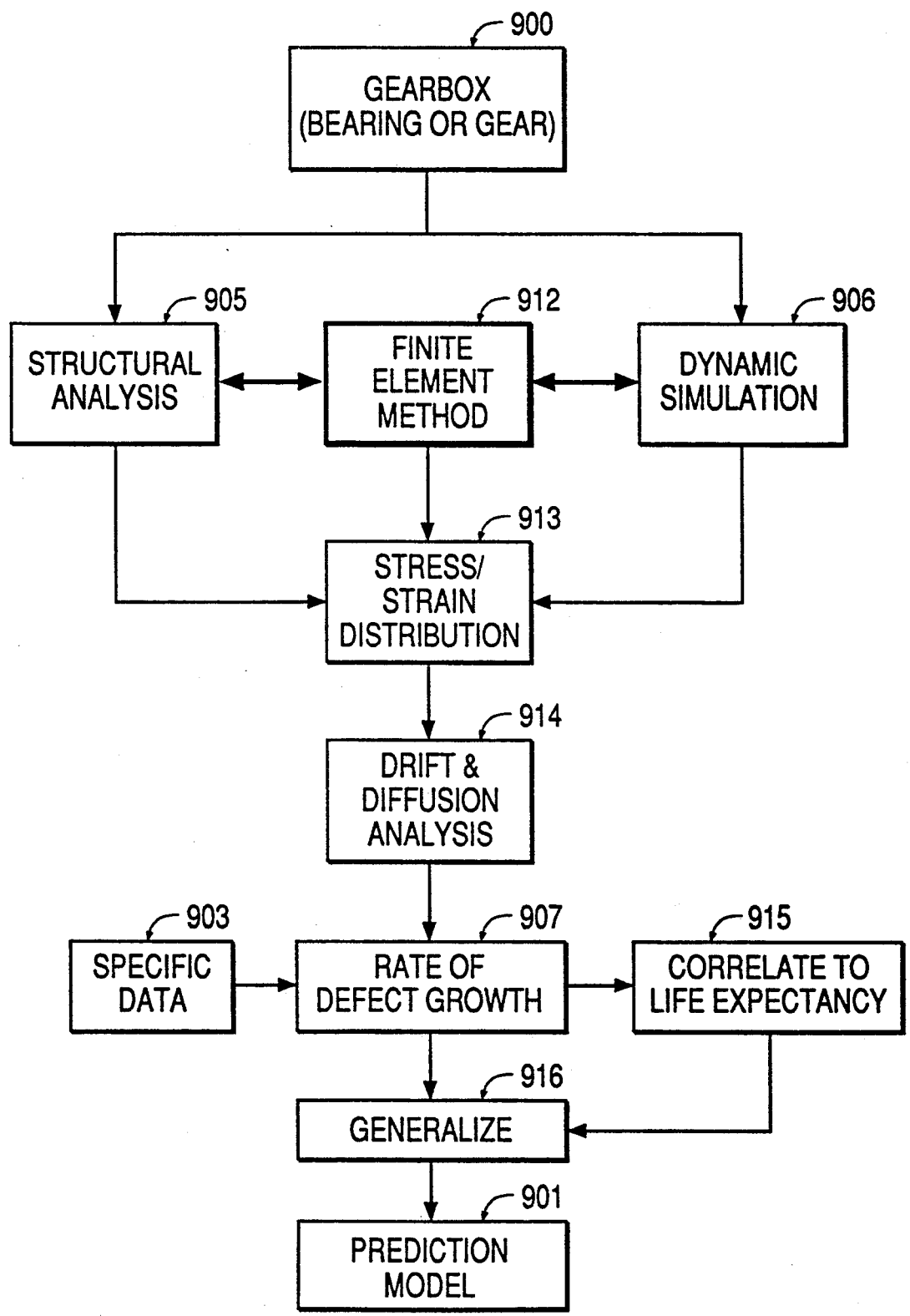
FIG. 16 is an implementation of the wearout monitor-L of FIG. 15 for generation of the prediction model for helicopter gearbox life expectancy.

A schematic representation of the interrelationship between individual aspects to be considered in generation of the life-expectancy prediction model is shown in the modular structure of FIG. 16 wherein the finite element method 912 determines the stress and strain distribution 913 through the structural analysis 905 and dynamic simulation 906. The drift and diffusion analysis 914 determines the prediction model of life expectancy 901 using correlations to life expectancy 915 of specific data from the knowledge data base 903, data on rate of defect growth 907 and providing generalization 916 that allows the construction of the model 901.

Figure 17:
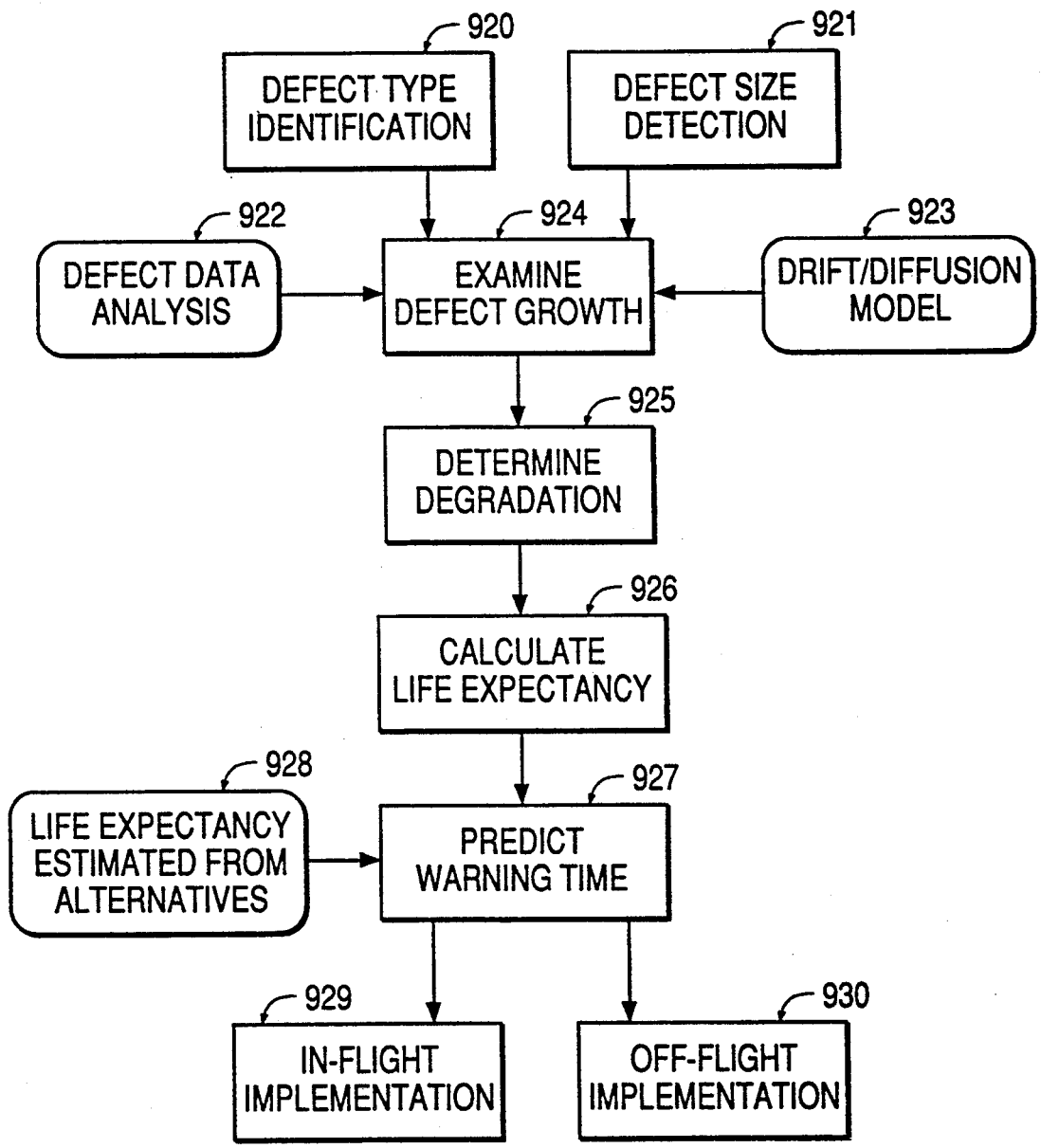
FIG. 17 is a model generation strategy for wearout monitor-L of FIG. 16.

FIG. 17 shows the basic functional components of the wearout monitor-L and the life expectancy prediction model. Malfunction signals generated by the abnormal motion of machinery cause contamination of metal chip detector. Block 920 and 921 detect the probable type and size of defects respectively within the gearbox based on the indication of metal contamination chip detector. The most critical elements and the most likely defects can be identified based on historical failure data analysis. Block 922 provides defect data including threshold values corresponding to specific defect size and type for defect growth analysis. Block 923 supplies the drift diffusion model for prediction. Feeding the identified defect messages into block 924 along with the utilization of drift of defects (rate of growth) and diffusion within the component, the drift and diffusion coefficients for the model can be obtained based on the calculation of mean and variance of defect size at specific time references.

Defect growth due to microstructure destruction or deformation increases transmission power loss, and leads to degradation which can be determined by degradation distribution in block 925. The model can then be used to calculate mean and variance functions for all times according to the existing drift and diffusion coefficients. Based on this feature in degradation failure, elements of the drift and diffusion processes can then be utilized to predict the reliability and to find the moments of the time to first failure of systems in block 926. Consequently, in block 927, the warning time can be predicted from the mean time to first failure (MTTFF) obtained from the moments of the defect-initiated failure/degradation distributions. Other signals from the existing measuring devices such as the torque-meter are also considered in block 928 to relate to the defect size and life expectancy and thus supports prediction of the warning time. Reliable prediction permits the use of the model in in-flight implementation 929 and off-flight (or pre-flight) implementation 930.

Figure 18:
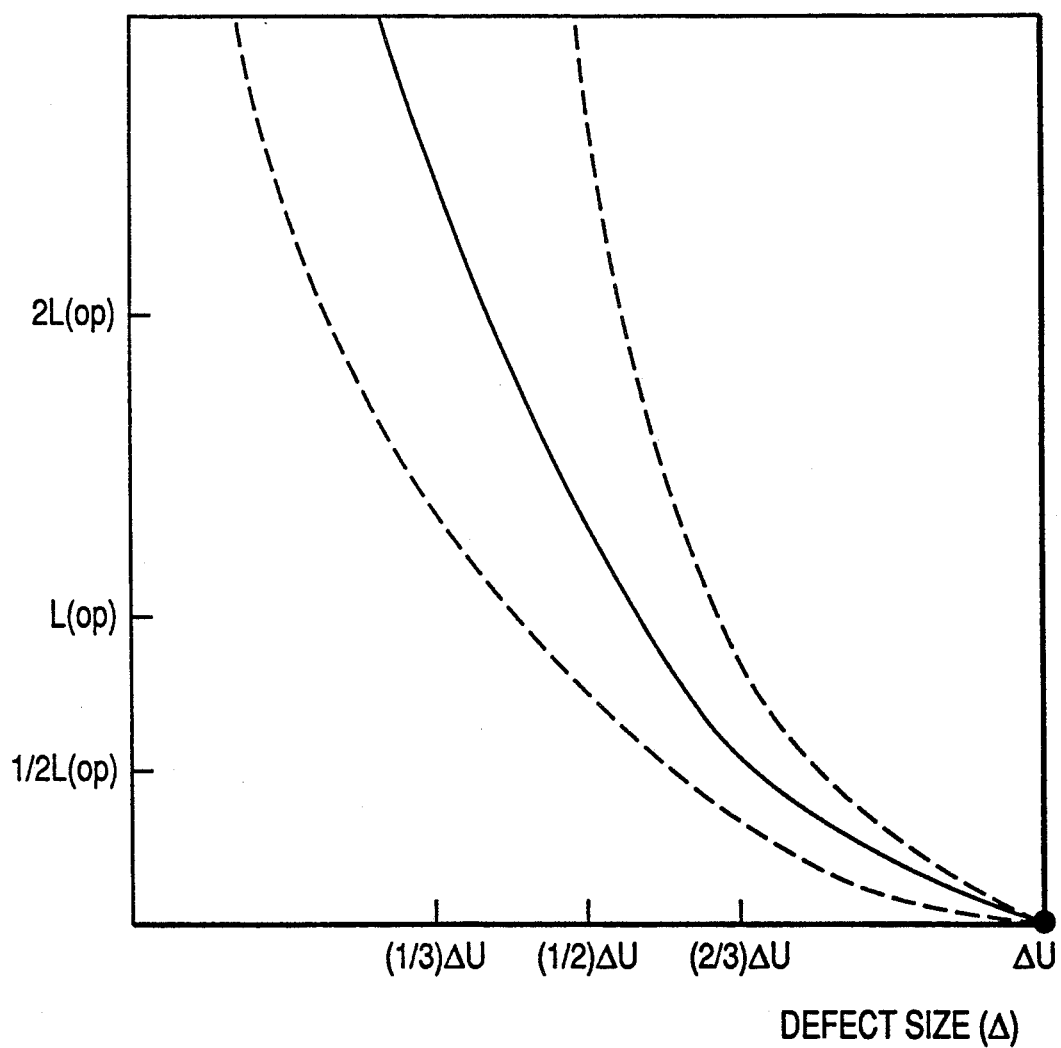
FIG. 18 is a plot of the relationship between the warning time and the defect size.

The prediction model utilizes the ability to detect defect size and type to provide a reliable warning time before the loss of transmission power and the defect size is used to evaluate the instantaneous life expectancy of a helicopter gear or bearing with time since new (TSN) as a reference point, that is prior to initial development of a defect. That life expectancy is then used to provide the warning time. FIG. 18 shows the relationship between the warning time and the defect size for various types of defects in bearings and gears. The solid line represents a specific gear tooth defect wherein the critical defect (that leads to loss of transmission power) is 0.6 mil.

The relationship in case of starting with a flawless gearbox is $$L^i_w = (\Delta^i_U/\Delta^i - 1)L_{op},$$

where $L^i_w$ is the warning time due to a defect in rolling element of type i, $\Delta$ is the defect size in mils, $\Delta_u$ is the critical defect size, and $L_{op}$ is the cumulative flight time, that is time since overhaul (TSO).

Figure 19:
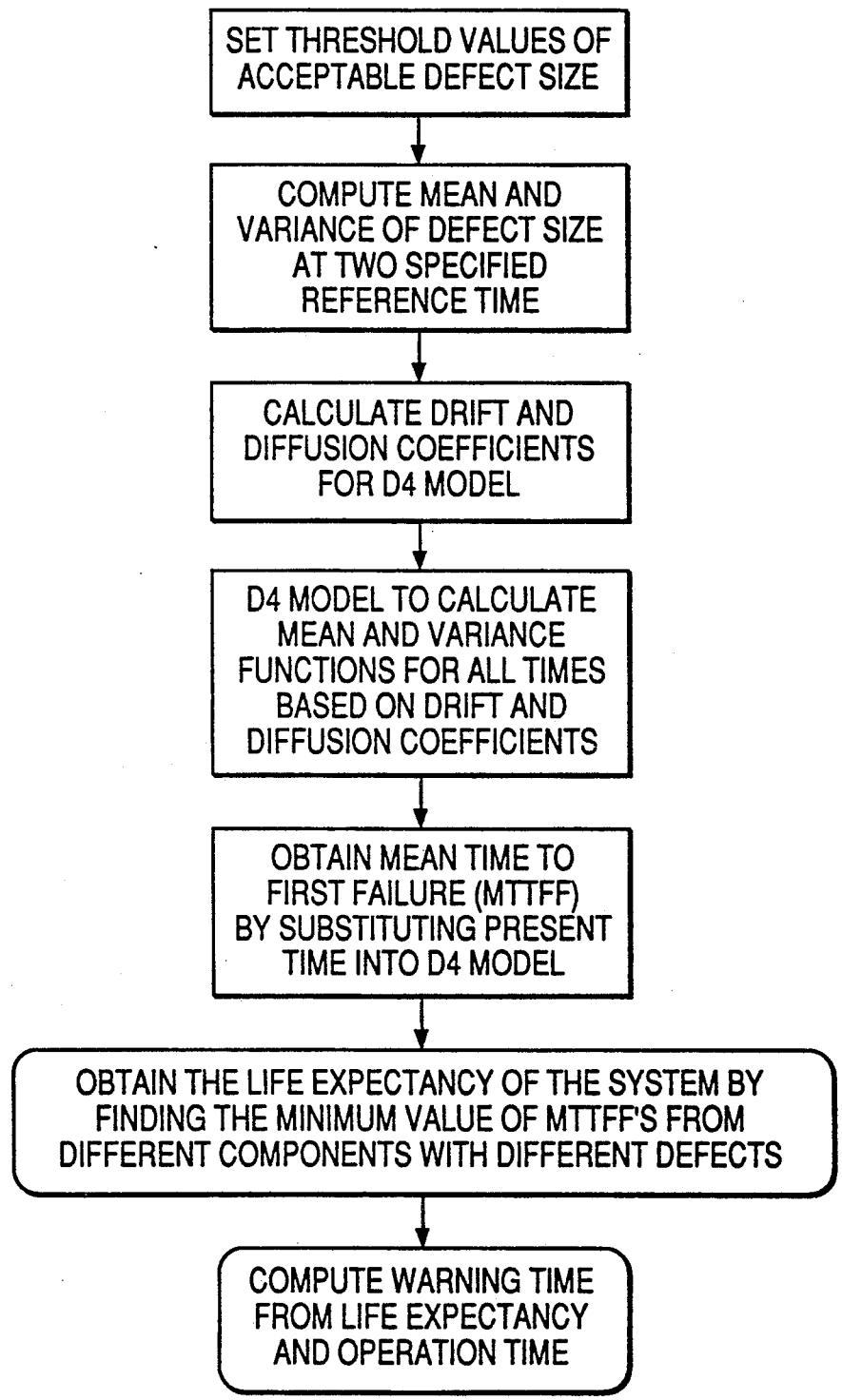
FIG. 19 is a logic flowchart of the model used in wearout monitor-L.

FIG. 19 shows the logic diagram of the prediction algorithm. The required information include an acceptable defect size which need to be evaluated by testing and continuous monitoring of the defect size (sampling at a reasonable sampling period). The instantaneous defect sizes are used to compute the drift and diffusion coefficients. The D4 model then provides the life expectancy which is used to predict the warning time. The warning time may vary with time should the loading mode change.

Figure 20:
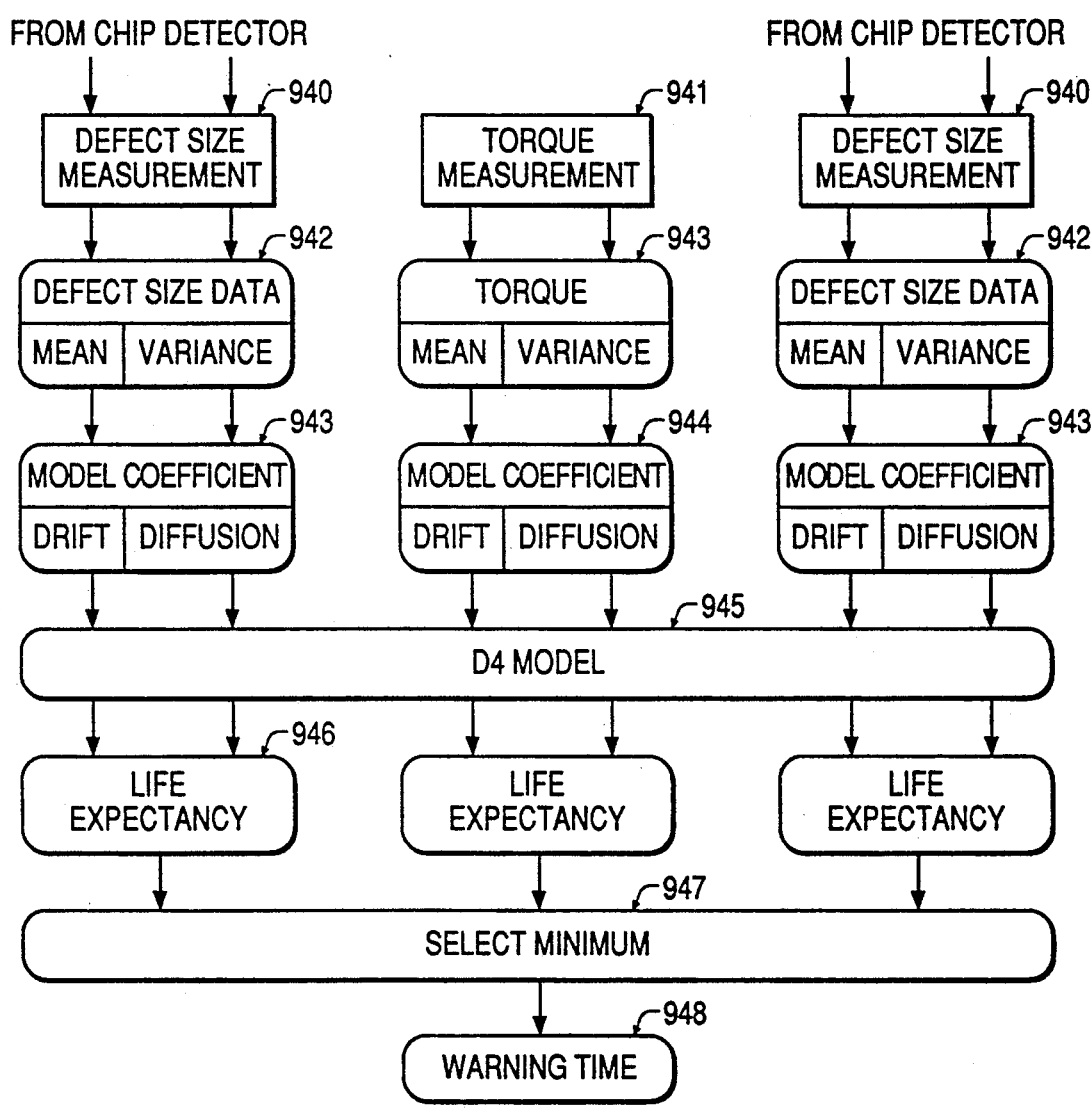
FIG. 20 is a block diagram of the life expectancy prediction process for a helicopter gearbox including providing of a warning time before failure of transmission.

FIG. 20 shows the functional configuration of the drift diffusion model, in which the prediction algorithm described in FIG. 17 has been implemented. The critical size for every specific defect and critical scale of measurement resulted form various instruments with certain safety factors have to be set to determine the threshold values of safety operation. Block 940 provide means for defect size estimation from the measurement of chip detector, and the torque measurement in block 941 can be obtained from torquemeter of any other appropriate sensors. Block 942 will calculate the mean value and variance of defect size, and block 943 provides similar calculations for the torque. Then, the instantaneous defect sizes and torque measurements can be used to calculate the drift and diffusion coefficients in block 943 and 944 for the defect size and the torque, respectively. Block 945 will use the drift and diffusion coefficients to calculate mean values and variance functions for all times, to construct the model and in blocks 946 the mean time to first failure and the life expectancy are obtained at a given instant of time.

Most of the time, critical defects in a system are those which can cause damage to the rolling elements and which result in the inability to no longer transmit the required operating power. Data obtained from size and type of detector is directed to a series of alternative predictors which compute the life expectancy based on different measurements. A specific measurement based on changes in the torque values is considered in this case parallel to the defect growth in size in real-time in-flight implementation. Block 947 identifies and compares the life expectancy of each element of the system, and finds the minimum value of mean time to first failure from different components with different defects. Finally, the warning time can be computed from life expectancy and operation time of the most critical component in block 948.

Figure 21:
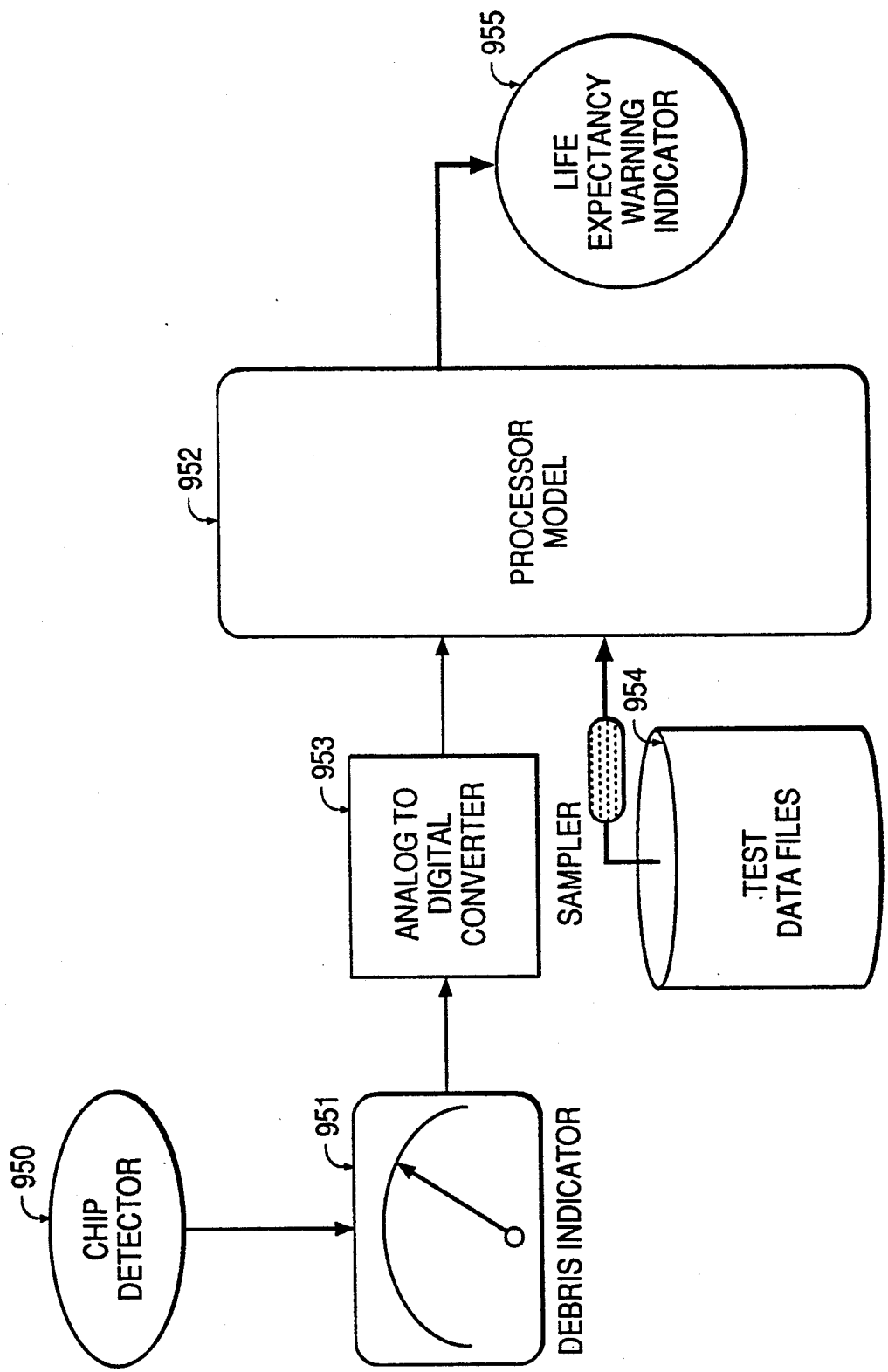
FIG. 21 is a hardware arrangement for in-flight warning time prediction implementation for helicopter gearbox; and, FIG. 22 is an off-flight warning time prediction implementation for helicopter gearbox.

FIG. 21 shows the layout of an in-flight system for the warning time predictor. The signals from the chip detector (block 950) and debris indicator (block 951) are directed to the processor model (block 952) via an analog-to-digital converter (block 953). The drift diffusion model is integrated into a processor which uses test data files 954 to provide the warning time display (block 955).

As shown in FIG. 21, the configuration for inflight implementation of the model. Data from size and type detector is directed to a series of predictors which compute the life expectancy based on each defect. The warning time is then selected as the minimum of the estimated life expectancy values. Furthermore, a model, similar to the prediction of life expectancy time in terms of defect size, can be developed based on changes in the torque values which are expected to decrease slightly as the defect grows in size. The logic for the torque life expectancy prediction system is also shown in FIG. 21. However, the impact of the size of a single defect on the torque is not expected to affect changes in torque values at constant power input until the defect becomes close to critical. In case of the initiation of more defects of different types, the torque-based predictor will be important.

The prediction systems for various components can work in concert with another predictor that uses the change in the torque to predict the remaining overall gearbox life. At any instance the value obtained from the torque predictor is less than that predicted by the defect detectors, the torque prediction has to be taken as the warning time.

Figure 22:
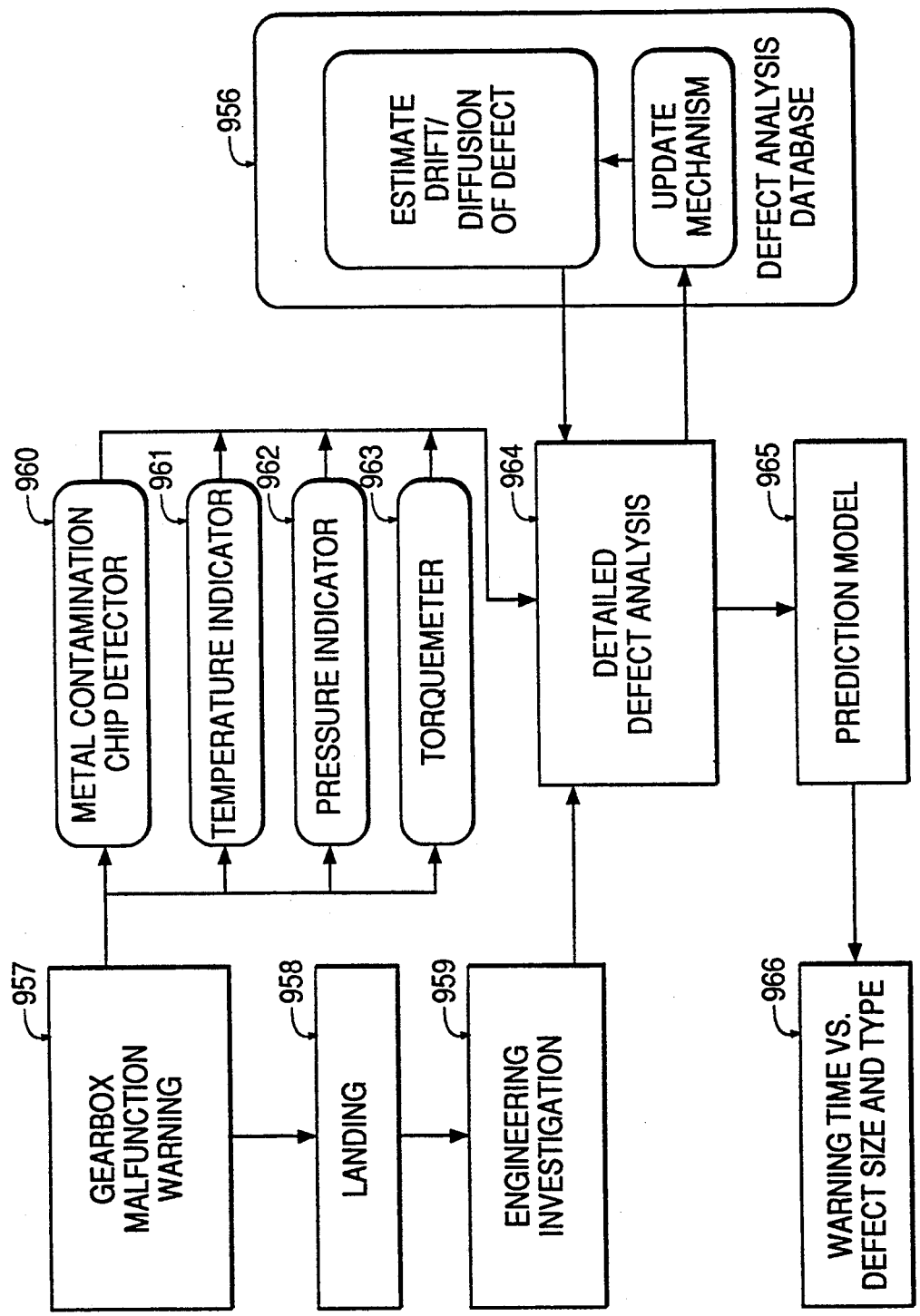

FIG. 22 shows the layout of an off-flight system for warning time predictor. A defect analysis database module, block 956 is constructed from under-load testing wherein defects are intentionally initiated to determine the threshold indices of drift and diffusion coefficients. In block 956 a consolidated defect database and an efficient update mechanism are included for rapid data access and updating.

Multiple data input to the off-flight system can be used to calibrate the instruments used in-flight for indication of warning time. Block end provides the malfunction warning that appears during the flight, and a landing (block 958) proceeds for engineering investigation (block 959). At the same time, metal chip contamination detector (block 960), temperature indicator (block 961), pressure indicator (block 962), and torquemeter (block 963) take measurements in parallel to the block 964 for detailed defect analysis and drift and diffusion of defect existed in database, the prediction model (block 965) provides the information of warning time versus defect size and type (block 966).

The prediction model is capable of providing quantitative prediction of the remaining life after the initiation of a defect in terms of defect size in a bearing or a gear. The warning time computed by the D4 model is explicitly related to the size and type of defect. The model is independent of which type of element the defect occurs in (gear or bearing) as long as the defect size is detected for the element under consideration; however, the model is compatible with the failure mechanism of rotary equipment and elements. The warning time can be displayed or indicated to the aircrew. The warning time can be evaluated accurately within statistical uncertainties and within an acceptable range, appropriate for safe abortion of the mission. The model capability can be extended to consider the applied load (torque) and operating conditions (variability of load).

The D4 model-based predictor benefits from the simplicity and the light weight and small size of the required equipment for in-flight implementations, the potential of reducing in-flight processing by developing a data bank on drift coefficient, minimal cost of implementation in-flight or off-flight, the model does not directly depend on material properties, plasticity or other complex phenomena and the equipment are off-the-shelf items.

The uncertainty in the warning time is determined by the diffusion coefficient, D, that is, $$\text{uncertainty} \approx \mp \sqrt{2DL_{op}}$$

where $L_{op}$ is the operation time after start of the defect. This is expected to be in the range of 0.12 minutes.

The prediction based on the D4 model is limited by identification of the size(s) of the defect. Such limitations were dealt with by introducing the torque-based predictor as a redundant system. Another limitation is the need to identify the defect type or associate the defect with a critical component.

This limitation can be relaxed by the application of the model to the whole main gearbox rather than on component by component basis.

The foregoing described embodiment has been included herein for illustrative purposes only, and is in no way intended to limit the scope of this invention. Modifications to this embodiment and further embodiments scope thereof will be apparent to those skilled in the art. It is, therefore, to be understood that the spirit and scope of the invention be limited only by the appended claims.

What is claimed is:

1. A wearout monitor and control device for failure prognostics comprising:
   a component susceptible to failure;
   a system data acquiring means for acquiring system data relating to the operation of said component;
   a data processing means for processing data received from said system data acquiring means relating to the operation of said component, said data processing means including a performance evaluation means for evaluating the performance of said component and a failure predicting means for predicting failure of said component;
   a failure indicating means for indicating a failure predicted by said failure predicting means; and
   means for regulating further operation of said component in response to a failure being predicted by said failure predicting means.

2. A wearout monitor as claimed in claim 1, wherein the means of acquiring system data comprise sensors for measuring data related to said component being monitored and sensors for measuring overall system parameters.

3. A wearout monitor as claimed in claim 2, wherein data received by said system data acquiring means is received by a multiband pass filter.

4. A wearout monitor as claimed in claim 3, further comprising a sample-and-hold means for receiving signals form said multiband pass filter.

5. A wearout monitor as claimed in claim 4, further comprising a multiplexer-and-switch means for receiving signals from said sample-and-hold means, wherein said multiplexer-and-switch means supplied signals to an analog-to-digital converter means, which in turn supplies signals to a data storing means for storing data representative of the state of said component.

6. A wearout monitor as claimed in claim 1, wherein data processing means includes a performance evaluation means for evaluating the performance of said component, and a failure predicting means for predicting failure of the component.

7. A wearout monitor as claimed in claim 6, wherein said performance evaluation means includes fitting said system data with an empirical time series model and establishing a model parameter of said model with a dynamic estimator means for filtering the noise in said system data.

8. A wearout monitor as claimed in claim 7, wherein said model parameter provides indication of the dynamic behavior of the component.

9. A wearout monitor as claimed in claim 1, wherein said performance evaluation means analyzes the performance of a plurality of components.

10. A wearout monitor as claimed in claim 1, wherein said failure predicting means includes an expert shell means for failure conditions and inference of failure states from a failure data bank.

11. A wearout monitor as claimed in claim 1, wherein said failure predicting means includes a rule-based failure data bank.

12. A wearout monitor as claimed in claim 1, wherein said failure indicating means includes at least one display terminal.

13. A wearout monitor as claimed in claim 1, further comprising a data storing means for storing data, wherein said data storing means receives data from said system data acquiring means and supplies the data to the data processing means.

14. A wearout monitor as claimed in claim 7, wherein said failure predicting means comprises means for matching said empirical model parameters with rule-based failure data.

15. A wearout monitor as claimed in claim 10, wherein said expert system identifies the nature and location of a failure.

16. A method for predicting failure of and regulating components in a system during a continuous operation of the components, comprising the steps of:
   providing at least one component to be monitored;
   providing a means for receiving data relating to the operation of said component;
   providing a means for processing the data relating to the operation of said component, said means for processing the data including an expert system, a means for predicting failure, and a performance evaluating means;
   providing a means for indicting predicted failure of said component;
   receiving data indicative of the operation of said component with said means for receiving data;
   processing data received from said means for receiving data by said means for processing data including evaluating the performance of said component by said means for evaluating performance, and analyzing the data to predict failure of said component by said means for prediction failure;
   indicating predicted failure of said component by said means for indicating predicted failure; and
   regulating further operation of said component in response to a predicted failure.

17. A method as claimed in claim 16, further comprising providing a means for component identification.

18. A method as claimed in claim 17, further comprising providing a rule-based failure data bank.

19. A method as claimed in claim 16, further providing a template means and applying said template means to the processed data to determine a match for prediction of expected local failures, expected global failures, and for indicating whether no match has occurred.

20. A method as claimed in claim 16, wherein said means for data processing conducts a trend analysis of predictions, said trend analysis of predictions includes comparing extrapolated predictions with prior extrapolated predictions, checking the trend of the comparison, and supplying information for matching.

21. A method as claimed in claim 20, further comprising providing a rule-based failure data bank; and applying information from said rule-based failure data bank during checking of a trend relating to the prior extrapolated predictions.

22. A method as claimed in claim 21, further comprising providing a means for updating rules and updating rules in said rule-based failure data bank.

23. A method as claimed in claim 22, wherein said step of updating rules includes:
   providing a means for supplying signals to said means for updating rules; and,
   supplying signals to said means for updating rules to cause updating of said rule-based failure data bank.

24. A method of predicting incipient failure of and regulating the operation of rotating mechanical components, comprising the steps of:
   providing at least one component to be monitored;

developing knowledge based models of a system employing said component;

examining the process design and analyzing failure modes, causes of failure, and the effects of failure on the system;

examining operation procedures constructing rule-based operation rules indicative of failure modes, causes of failure and effects of failure;

monitoring said component and said system and predicting failure of said component and said system; and regulating further operation of said system in response to a failure being predicted.

25. A method as claimed in claim 24, wherein said analyzing failure modes, causes of failure, and the effects of failure are performed on the overall system and said component including the effects of component failure on the overall system.

26. A method as claimed in claim 24, wherein said constructing rule-based operation rules relates changes in instrumentation signals to the failure modes, failure causes, and failure effects.

27. A method as claimed in claim 24, further comprising:

synthesizing an empirical time series model from measured signals;

estimating the parameters of the empirical model through time series analysis of measured data using a dynamic estimator;

predicting the optimum dynamic behavior of the system and the component by evaluating the noise covariance matrix and dynamic estimator gain;

employing a feature matching algorithm to identify the empirical model parameters from a knowledge-based model; and using a rule-based expert system to identify the nature and location of failure.

28. A method as claimed in claim 24, further comprising performing process simulation and analysis scenarios of anticipated failures.

29. A method as claimed in claim 28, constructing matching templates of failure from simulation results.

30. A method as claimed in claim 24, constructing matching templates of failure from said rule-based operation rules.

31. An apparatus for on-line diagnosis of defects and failure, prognosis of incipient failures and controlling of mechanical systems having rotating equipment, comprising:

at least one component of a system susceptible to incipient failure;

two independent channel means for acquisition of signals from global sensors and local sensors;

a data acquisition means for processing the signals from the said channel means for use by a central processing unit; said central processing unit including means for analyzing the data input from said data acquisition means relating to the operation of said component;

analyzing means for identifying abnormalities in said data input in comparison with reference normal data compiled in a knowledge base means stored in said central processing unit;

identifying means for identifying the type and extent of the abnormality relating to the operation of said component by the aid of said knowledge base means;

display means for displaying the abnormalities identified by said identifying means and relating to the operation of said component; and control means connected to the system for controlling the operation of the system and shutting down the operation of the system in response to an abnormality detrimental to the operation of the system.

32. Apparatus as set forth in claim 31, wherein said data acquisition means comprises:

a multiband pass filter means for processing signals according to predefined frequency bands;

a means for sampling data according to predetermined sampling intervals;

a hold means, a multiplexer means and switch means for managing the flow of data to the central processing unit means in batches appropriate for processing according to predetermined data acquisition strategy; and, a converter means for converting analog signals to digital signals.

33. Apparatus as set forth in claim 31, wherein analysis means comprises a fast Fourier transform analyzer and a time series analysis module.

34. Apparatus as set forth in claim 33, wherein said analysis means provides indices of normal and abnormal behavior in the operation of said component and generates empirical models from said data of said component to be monitored.

35. Apparatus as set forth in claim 34, wherein said identifying means comprises:

means for identifying component abnormalities from said indices and said models;

pattern recognition means for comparison of abnormalities with said knowledge base;

prognostic means for predicting faults before their occurrence;

diagnostic means for detecting failures and monitoring symptoms of potential faults; and, means for localizing failure by attributing the failure to one of a plurality of components, wherein said prognostic and diagnostic means operate independently and in parallel as a redundant detection system.

36. Apparatus as set forth in claim 35, further comprising a pattern recognition means for recognizing patterns including templates of defect patterns.

37. Apparatus as set forth in claim 35, wherein said comparison involves identifying minimum distance between failure indices and said templates of defect patterns.

38. Apparatus as set forth in claim 31, wherein said knowledge base means is continuously updated with new failure data and includes a self learning means for upgrading the knowledge base.

39. Apparatus as set forth in claim 38, wherein the knowledge base includes a knowledge base for diagnosis, a knowledge base for prognosis and maintenance management means.

40. Apparatus as set forth in claim 35, wherein said identifying means includes a diagnostic logic means and prognostic logic means.

41. Apparatus as set forth in claim 40, wherein said diagnostic logic means and said prognostic logic means provide diagnosis and prognosis messages respectively indicating trends, symptoms and signals of incipient failures of said component.

42. Apparatus as set forth in claim 41, wherein said messages and said maintenance management means are used by a decision means to determine the type and location of actual faults or incipient failure of said component.

43. Apparatus as set forth in claim 31, wherein said display means comprises a printing means, a video display means and graphics display means.

44. A method for on-line diagnosis and prognosis of failure in rotating mechanical equipment and controlling the operation of the equipment, comprising:
provided mechanical components constituting mechanical equipment which is susceptible to failure;
sensing local conditions of specific components and global conditions of a system containing said components;
monitoring said components by performing analysis of signals representing said local and global conditions;
performing time series analysis and signal analysis on said signals to provide empirical model identifying equipment operating conditions relative to preselected indices appropriate for representation of normal and abnormal conditions of the operation of said equipment;
performing diagnosis and prognosis independently using separate knowledge bases and using pattern recognition to recognize symptoms of failure or incipient failure in any one of said components;
producing messages indicative of changes in trends or of identified symptoms of the operation of said equipment; and
regulating operation of said equipment if the changes in trends or in identified symptoms relate to a potentially failing component.

45. The method of claim 44, further comprising, providing a learning knowledge base for continuous updating of stored data and for constructing new templates for pattern recognition.

46. The method of claim 44, wherein the step of monitoring includes:
global monitoring of said components using a global database comprising data relating to operating conditions to provide diagnosis and prognosis fault messages as they relate to said components;
fault searching using a rule base formed by fault tree analysis associating predetermined faults to certain equipment, assigning probabilities to each fault, and tracing the root causes of major faults identified by said global monitoring; and,
local monitoring of said components within said equipment using a local database comprising data relating to conditions of said components and said fault searching to provide diagnosis and prognosis fault messages as they relate to said components of said equipment.

47. The method of claim 44, further comprising the steps of:
acquiring signal analysis data from the sensors of the equipment;
setting up the diagnostic and prognostic procedure;
implementing an on-line monitoring method iteratively by searching for abnormal conditions;
evaluating the pattern of each index, and evaluating different matched filters for different indices;
performing prognosis with a first prognostic knowledge base;
performing diagnosis with the same logic of the prognostic step with a second knowledge base; and shutting down the equipment and replacing a potentially defective component if the potential failures are determined to be serious.

48. The method of claim 47, wherein setting up the diagnostic and prognostic procedure comprises:
determining an adequate sample size sampling frequency, and filtering strategy of the signals data;
initiating the model parameters by fitting the signal data in normal conditions;
selecting an index vector which is sensitive to malfunctions;
calculating an index vector in normal conditions;
setting the threshold vectors for prognostics and diagnostics.

49. The method of claim 47, wherein the step of implementing the on-line monitoring method comprises the steps of:
measuring input data vectors from various sensors relating to selected components;
estimating model parameters in the monitored conditions;
updating the model parameters for the monitored conditions;
storing the model parameters in model storage files;
computing an index vector in the monitored conditions;
calculating the values of prognostic vectors and diagnostics vectors as composite vectors of the index vector of said normal conditions and index vector of said monitored conditions;
comparing said prognostic vector with a prognostic failure threshold index vector as criterion for incipient failure of any one of said components;
comparing said diagnostic vector with a diagnostic failure threshold index vector as criterion for the presence of fault;
waiting for the next sample if no abnormality evaluated by prognostics/diagnostics exists;
indicating abnormality if any one of the criteria for prognostics and diagnostics is violated; and,
implementing said prognostic and diagnostic monitoring sequentially and in parallel.

50. The method of claim 49, wherein evaluating the pattern of each index, and evaluating different matched filters for different indices; includes performing pattern recognition through a series of pattern evaluations in the matched filter.

51. The method of claim 50, wherein said performing prognosis and performing diagnosis comprise the steps of:
invoking prognostic functions and diagnostic functions;
retrieving the model parameters from the model storage file for predicting future faults;
predicting a future data vector;
calculating a specific prognostic index vector for failure pattern recognition;
storing and providing pattern classification of each index;
identifying and indicating all possible types of defect;
checking possible failure alternatives if one defect has been prognosed;
managing a maintenance scheme if prognostic failures are identified;
displaying the information of prognostic failures and correct compensation;

sounding an alarm when the prognostic mechanism and its knowledge base are unable to manage a potential fault; and, supplementing said prognostic knowledge base by the new potential fault for future usage.

52. A wearout monitoring method for predicting life expectancy of rotating equipment and controlling the operation of the equipment, comprising:

providing at least one component of the rotating equipment to be monitored;

detecting defect sizes;

analyzing anticipated failures of said components, identifying failure modes, failure causes, and failure effects;

analyzing and classifying historical data of operation and failure of the equipment and said components according to a taxonomy of failure modes, failure causes, failure effects, types of defects, and size of defects;

constructing a knowledge base from said analyzed historical data and said analyzed anticipated failures as they relate to different loading conditions;

specifying defect threshold size that results in wearout failure of said component;

constructing a life expectancy prediction model based on predetermined defect growth rates and said defect threshold size;

computing the remaining life of said component corresponding to each defect size; and controlling the operation of the equipment in response to the remaining life of said component.

53. The method of claim 52, wherein said knowledge base contains data from dynamic simulation of the equipment and said component under different loading conditions and data derived from said dynamic simulation on life expectancy and defect growth rates.

54. The method of claim 53, wherein said knowledge base contains data derived from structural analysis of said component as it relates to local stresses and loading stresses and the associated strain leading to development of defects.

55. The method of claim 52, wherein said computing of the remaining lief is provided as a warning time that indicates the time before a catastrophic operation failure which is less than the remaining life of said component.

56. The method of claim 55, further comprising the incorporation of said warning time and prognostics of incipient failure into a warning system.

57. The method of claim 56, wherein said prognostics of incipient failure uses additional indicators from a group including decline of torque and or temperature increase in a lubricant.

58. The method of claim 54, wherein each of said structural analysis and said dynamic simulation use a finite element method.

59. The method of claim 58, wherein said finite element method provides stress and strain distribution in the component.

60. The method of claim 52, wherein said life expectancy prediction model comprises:

analyzing drift and diffusion of defects in the component;

calculating drift coefficients and diffusion coefficients from a predetermined rate of defect growth and defect size; and computing mean times to first failure for each type of defect according to a predetermined statistical distribution of defects.

61. The method of claim 60, wherein drift coefficient is the mean of a defect size statistical distribution and said diffusion coefficient is the variance of said distribution.

62. The method of claim 60, wherein a warning time is determined to be the minimum mean time to first failure.

63. The method of claim 62, wherein the said minimum mean time to first failure is compared to a time drop of torque and to other time characteristics of operation.

64. The method of claim 63, wherein the shortest characteristic time is a time at which to abort the operation of said component.

65. An apparatus for determining on-line operation life of a component of rotating equipment before the rotating equipment can no longer transmit the required operating power and for aborting the operation of the equipment, comprising:

at least one component of the equipment having an operational life expectancy;

a chip detecting means for detecting the size of defects by the size of chips in said component and generating an analog signal indicative thereof;

a debris indicating means for indicating debris from said component of the rotating equipment and generating an analog signal indicative thereof;

means for converting analog signals from said chip detecting means and said debris indicating means;

data processing means for processing data and implementing a life expectancy prediction;

means for displaying a warning time; and control means for aborting the operation of the equipment in response to a predetermined warning time.

66. The apparatus of claim 65, wherein said data processing means comprises test data files and means for computing drift coefficients and diffusion coefficients from statistical analysis of defect size distribution and subsequently computing a mean time to first failure associated with each defect.

67. Apparatus as set forth in claim 66, wherein said data processing means processes data from said indicator and said detector and sample relevant test data from said test data files.

68. Apparatus as set forth in claim 66, wherein said mean time to first failure of each defect are used to predict life expectancy and compute said warning time.

69. Apparatus as set forth in claim 65, wherein said means for displaying the warning time comprises a digital display means for displaying said warning time in hours, minutes and seconds and a warning light for indicating when said warning time is short.

70. Apparatus as set forth in claim 66, wherein said data processing means computes the change in parameters associated with operation of the equipment other than defect growth including torque and temperature rise.

71. Apparatus as set forth in claim 66, wherein said test data files are generated from off-line testing, engineering investigation and simulated computation of warning time as it relates to defect size and type.

* * * * *